US012328012B2

United States Patent
Peralta et al.

(10) Patent No.: US 12,328,012 B2
(45) Date of Patent: *Jun. 10, 2025

(54) WIRELESSLY POWERED SENSOR SYSTEM

(71) Applicant: NuCurrent, Inc., Chicago, IL (US)

(72) Inventors: Alberto Peralta, Chicago, IL (US);
Michael Katz, Glen Ellyn, IL (US);
Md. Nazmul Alam, Glendale Heights, IL (US)

(73) Assignee: NuCurrent, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/528,251

(22) Filed: Dec. 4, 2023

(65) Prior Publication Data
US 2024/0305134 A1    Sep. 12, 2024

Related U.S. Application Data

(63) Continuation of application No. 17/966,545, filed on Oct. 14, 2022, now Pat. No. 11,837,879, which is a
(Continued)

(51) Int. Cl.
*H02J 50/12* (2016.01)
*G01D 7/00* (2006.01)
(Continued)

(52) U.S. Cl.
CPC ............... *H02J 50/12* (2016.02); *G01D 7/00* (2013.01); *H02J 50/80* (2016.02); *H02J 50/60* (2016.02); *H04L 27/02* (2013.01)

(58) Field of Classification Search
CPC .. H02J 50/12; H02J 50/80; G01D 7/00; H04L 27/02
(Continued)

(56) References Cited

U.S. PATENT DOCUMENTS 9,780,600 B2 * 10/2017 Sentosa ............... H02J 7/04
10,892,800 B1   1/2021 Katz
(Continued)

FOREIGN PATENT DOCUMENTS

WO    2010075479 A2    7/2010

OTHER PUBLICATIONS

International Searching Authority, PCT International Search Report and Written Opinion, PCT International Application No. PCT/US2022/014598 dated May 19, 2022, 7 pages.
(Continued)

*Primary Examiner* — Alfonso Perez Borroto
(74) *Attorney, Agent, or Firm* — Lee Sullivan Shea & Smith LLP

(57) ABSTRACT

A sensing system includes a sensor, a wireless transmission system, a wireless receiver system, and a controller. The sensor is configured to determine sensor data, the sensor data associated with a sensing environment. The wireless transmission system is configured to wirelessly couple with the sensor, the wireless transmission system configured for wirelessly providing significant electrical energy to the sensor as wireless power signals and receive the sensor data as in-band data signals encoded in the wireless power signals. The wireless receiver system is operatively associated with the sensor and with which the wireless transmission system couples with the sensor and is configured to receive the significant electrical energy as the wireless power signals from the wireless transmission system. The controller is operatively associated with the wireless transmission system and is configured to decode the in-band signals from the wireless power signals as the sensor data.

20 Claims, 12 Drawing Sheets

Related U.S. Application Data continuation of application No. 17/164,515, filed on Feb. 1, 2021, now Pat. No. 11,476,712.

(51) Int. Cl.
*H02J 50/80* (2016.01)
*H02J 50/60* (2016.01)
*H04L 27/02* (2006.01)

(58) Field of Classification Search
USPC .......................................................... 307/104
See application file for complete search history.

(56) References Cited

U.S. PATENT DOCUMENTS

| | | | |
|---|---|---|---|
| 11,476,712 B2 * | 10/2022 | Peralta | H02J 50/80 |
| 11,837,879 B2 * | 12/2023 | Peralta | G01D 7/00 |
| 2004/0130916 A1 * | 7/2004 | Baarman | H05B 41/36 |
| | | | 363/21.02 |
| 2012/0161539 A1 | 6/2012 | Kim et al. | |
| 2012/0234971 A1 | 9/2012 | Bugash et al. | |
| 2015/0137746 A1 | 5/2015 | Lee et al. | |
| 2016/0254696 A1 | 9/2016 | Plumb et al. | |
| 2018/0131201 A1 * | 5/2018 | Calhoun | H02J 50/80 |
| 2018/0331586 A1 | 11/2018 | Hao et al. | |
| 2020/0021121 A1 * | 1/2020 | Lee | H02J 7/0036 |

OTHER PUBLICATIONS

EP Extended Search Report, EP Application No. 22746820.4, dated Nov. 14, 2024, 10 pages.

\* cited by examiner

WIRELESSLY POWERED SENSOR SYSTEM

CROSS-REFERENCE TO RELATED APPLICATIONS

This application is a continuation of, and claims priority to, U.S. patent application Ser. No. 17/966,545, filed on Oct. 14, 2022 and entitled "WIRELESSLY POWERED SENSOR SYSTEM," which, in turn, is a continuation of, and claims priority to, U.S. patent application Ser. No. 17/164,515, filed on Feb. 1, 2021 and entitled "WIRELESSLY POWERED SENSOR SYSTEM," each of which is incorporated by reference in its entirety.

TECHNICAL FIELD

The present disclosure generally relates to sensors and/or sensing systems, and, more particularly, to sensors and/or sensing systems that are wirelessly powered and wirelessly provide sensor data.

BACKGROUND

In modern times, sensors and/or sensing systems exist in almost every aspect of daily life. Consumer electronics, appliances, computers, professional equipment, industrial or enterprise equipment, among other things, all rely on more and more advanced sensors to adequately and accurately determine and process data for systems thereof.

As new forms and/or formerly difficult to determine/detect data are all desired to perform new functions or enhance previous functions in various products, new and/or unconventional placement of sensors, within a host or associated device, may be limited due to the necessity of electrical connection. Because most sensors are active components, needing electrical power, even at low levels, to perform its sensing task, sensors, generally, will need either a wired conductive electrical connection or a battery connected to the sensor for powering the sensor.

Wired electrical connections may limit sensors, wherein it is to be located in a position on the host or associated device that is impossible or impractical to provide a wire thereto. Batteries can limit sensors, as no battery has an infinite power source and will eventually drain, plus batteries may add excess bulk to small sensors meant for tight placement in a host or associated device. Further still, even with a battery, some other connection, be it wired or wireless will be needed to get data from the sensor to a device or component exterior to the sensor itself.

SUMMARY

Thus, wireless connection and/or power systems are desired to eliminate physical power/data connectors and provide more positional freedom for such sensors. Further, a wireless connector that provides power to the sensor, while capable of receiving data from the sensor via a common wireless connection may solve many modern issues with new, hard-to-place sensors.

Such wireless connection systems are used in a variety of applications for the wireless transfer of electrical energy, electrical power, electromagnetic energy, electrical data signals, among other known wirelessly transmittable signals. Such systems often use inductive and/or resonant inductive wireless power transfer, which occurs when magnetic fields created by a transmitting element induce an electric field and, hence, an electric current, in a receiving element. These transmitting and receiving elements will often take the form of coiled wires and/or antennas.

Transmission of one or more of electrical energy, electrical power, electromagnetic energy and/or electronic data signals from one of such coiled antennas to another, generally, operates at an operating frequency and/or an operating frequency range. The operating frequency may be selected for a variety of reasons, such as, but not limited to, power transfer characteristics, power level characteristics, self-resonant frequency restraints, design requirements, adherence to standards bodies' required characteristics (e.g. electromagnetic interference (EMI) requirements, specific absorption rate (SAR) requirements, among other things), bill of materials (BOM), and/or form factor constraints, among other things. It is to be noted that, "self-resonating frequency," as known to those having skill in the art, generally refers to the resonant frequency of a passive component (e.g., an inductor) due to the parasitic characteristics of the component.

When such systems operate to wirelessly transfer power from a transmission system to a receiver system, via the coils and/or antennas, it is often desired to simultaneously or intermittently communicate electronic data from one system to the other. To that end, a variety of communications systems, methods, and/or apparatus have been utilized for combined wireless power and wireless data transfer. In some example systems, wireless power transfer related communications (e.g., validation procedures, electronic characteristics data communications, voltage data, current data, device type data, among other contemplated data communications) are performed using other circuitry, such as an optional Near Field Communications (NFC) antenna utilized to compliment the wireless power system and/or additional Bluetooth chipsets for data communications, among other known communications circuits and/or antennas.

However, using additional antennas and/or circuitry can give rise to several disadvantages. For instance, using additional antennas and/or circuitry can be inefficient and/or can increase the BOM of a wireless power system, which raises the cost for putting wireless power into an electronic device. Further, in some such systems, out of band communications provided by such additional antennas may result in interference, such as cross-talk between the antennas; such cross talk may present challenges in. Further yet, inclusion of such additional antennas and/or circuitry can result in worsened EMI, as introduction of the additional system will cause greater harmonic distortion, in comparison to a system wherein both a wireless power signal and a data signal are within the same channel. Still further, inclusion of additional antennas and/or circuitry hardware, for communications or increased charging or powering area, may increase the area within a device, for which the wireless power systems and/or components thereof reside, complicating a build of an end product.

Thus, low cost and/or low BOM demodulation circuits that allow for fast and accurate in-band communications are desired.

The demodulation circuit of the wireless power transmitters disclosed herein is a relatively inexpensive and/or simplified circuit utilized to, at least partially, decode or demodulate ASK signals down to alerts for rising and falling edges of a data signal. So long as the transmission controller 28 is programmed to understand the coding schema of the ASK modulation, the transmission controller will expend far less computational resources than it would if it had to decode the leading and falling edges directly from an input current or voltage sense signal from the sensing system. To that end, as the computational resources required by the transmission controller to decode the wireless data signals are significantly decreased due to the inclusion of the demodulation circuit. Thus, it follows, that the demodulation circuit may significantly reduce BOM of the wireless transmission system, by allowing usage of cheaper, less computationally capable processor(s) for or with the transmission controller.

In accordance with one aspect of the disclosure, a sensing system for a device is disclosed. The sensing system includes a sensor, a wireless transmission system, a wireless receiver system, and a controller. The sensor is configured to determine sensor data, the sensor data associated with a sensing environment, the sensing environment of or associated with the device. The wireless transmission system is configured to wirelessly couple with the sensor, the wireless transmission system configured for wirelessly providing significant electrical energy to the sensor as wireless power signals and receive the sensor data as in-band data signals encoded in the wireless power signals. The wireless receiver system is operatively associated with the sensor and with which the wireless transmission system couples with the sensor and is configured to receive the significant electrical energy as the wireless power signals from the wireless transmission system. The controller is operatively associated with the wireless transmission system and is configured to decode the in-band signals from the wireless power signals as the sensor data.

In a refinement, the device is a host device and the sensor is provided within the host device and the sensing environment is within the host device.

In a refinement, the device is an associated device and the sensing device is external to the associated device.

In a refinement, the wireless transmission system includes a transmitter antenna, a current sensor, and a demodulation circuit. The transmitter antenna is configured to couple with a receiver antenna of the wireless receiver system and transmit alternating current (AC) wireless signals to the at least one antenna, the AC wireless signals including the wireless power signals and the in-band signals, the in-band signals generated by altering electrical characteristics of the AC wireless signals at wireless receiver system. The current sensor is configured to detect electrical information associated with the electrical characteristics of the AC wireless signals, the electrical information including one or more of a current of the AC wireless signals, a voltage of the AC wireless signals, a power level of the AC wireless signals, or combinations thereof. The demodulation circuit is configured to (i) receive the electrical information from the at least one sensor, (ii) detect a change in the electrical information, (iii) determine if the change in the electrical information meets or exceeds one of a rise threshold or a fall threshold, (iv) if the change exceeds one of the rise threshold or the fall threshold, generate an alert, (v) and output a plurality of data alerts.

In a further refinement, the at least one controller is configured to (i) receive the plurality of data alerts from the demodulation circuit, and (ii) decode the plurality of data alerts into the sensor data.

In yet a further refinement, the in-band data signals are encoded by the at least one other system as amplitude shift keying (ASK) data signals.

In yet another further refinement, the wireless receiver system encodes the in-band data signals as high threshold and low threshold voltages of the AC wireless signals.

In yet a further refinement, the rise threshold is associated with the high threshold voltage and the fall threshold is associated with the low threshold voltage.

In yet another further refinement, the in-band data signals are encoded as pulse width encoded in-band data signals.

In a refinement, the transmission antenna is configured to operate based on an operating frequency of about 6.78 MHz.

In accordance with another aspect of the disclosure, a system for wirelessly receiving data from a sensor and wirelessly providing the sensor with meaningful electrical energy is disclosed. The sensor is configured to determine sensor data associated with a sensing environment, the sensing environment being of or associated with the device. The system includes a wireless transmission system configured to wirelessly couple with a wireless receiver system of the sensor, the wireless transmission system configured for wirelessly providing significant electrical energy to the sensor as wireless power signals and receive the sensor data as in-band data signals encoded in the wireless power signals. The system further includes a controller operatively associated with the wireless transmission system configured to decode the in-band signals from the wireless power signals as the sensor data.

In a refinement, the device is a host device and the sensor is provided within the host device and the sensing environment is within the host device.

In a refinement, the device is an associated device and the sensing device is external to the associated device.

In a refinement, the wireless transmission system includes a transmitter antenna, a current sensor, and a demodulation circuit. The transmitter antenna is configured to couple with a receiver antenna of the wireless receiver system and transmit alternating current (AC) wireless signals to the at least one antenna, the AC wireless signals including the wireless power signals and the in-band signals, the in-band signals generated by altering electrical characteristics of the AC wireless signals at wireless receiver system. The current sensor is configured to detect electrical information associated with the electrical characteristics of the AC wireless signals, the electrical information including one or more of a current of the AC wireless signals, a voltage of the AC wireless signals, a power level of the AC wireless signals, or combinations thereof. The demodulation circuit is configured to (i) receive the electrical information from the at least one sensor, (ii) detect a change in the electrical information, (iii) determine if the change in the electrical information meets or exceeds one of a rise threshold or a fall threshold, (iv) if the change exceeds one of the rise threshold or the fall threshold, generate an alert, (v) and output a plurality of data alerts.

In a further refinement, the at least one controller is configured to (i) receive the plurality of data alerts from the demodulation circuit, and (ii) decode the plurality of data alerts into the sensor data.

In yet a further refinement, the in-band data signals are encoded by the at least one other system as amplitude shift keying (ASK) data signals.

In yet another further refinement, the wireless receiver system encodes the in-band data signals as high threshold and low threshold voltages of the AC wireless signals.

In yet a further refinement, the rise threshold is associated with the high threshold voltage and the fall threshold is associated with the low threshold voltage.

In yet another further refinement, the in-band data signals are encoded as pulse width encoded in-band data signals.

In a refinement, the transmission antenna is configured to operate based on an operating frequency of about 6.78 MHz.

These and other aspects and features of the present disclosure will be better understood when read in conjunction with the accompanying drawings.

Figure 1A:
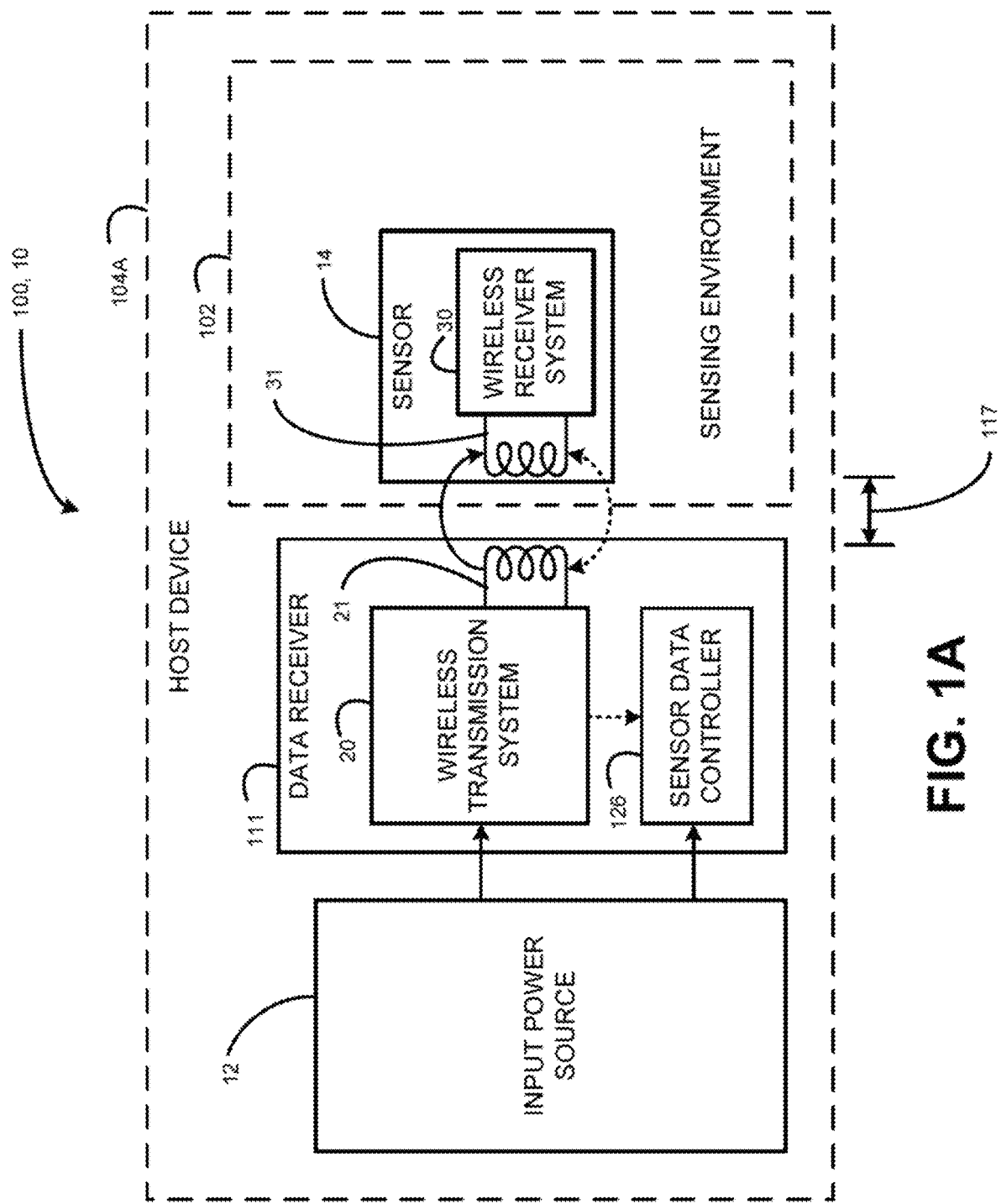
FIG. 1A is a block diagram for a first sensing system, in accordance with the present disclosure.

While the following detailed description will be given with respect to certain illustrative embodiments, it should be understood that the drawings are not necessarily to scale and the disclosed embodiments are sometimes illustrated diagrammatically and in partial views. In addition, in certain instances, details which are not necessary for an understanding of the disclosed subject matter or which render other details too difficult to perceive may have been omitted. It should therefore be understood that this disclosure is not limited to the particular embodiments disclosed and illustrated herein, but rather to a fair reading of the entire disclosure and claims, as well as any equivalents thereto. Additional, different, or fewer components and methods may be included in the systems and methods.

DETAILED DESCRIPTION

In the following description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Referring now to the drawings and with specific reference to FIGS. 1, block diagrams for a sensing system 100 are illustrated. The sensing system includes a sensor 14, which is configured to collect and/or determine sensor data from or associated with a sensing environment 102, within which the sensor may reside and/or monitor. The sensing environment 102 may be any location (one-dimensional space), area (two-dimensional space), and/or volume (three-dimensional space), within which the sensor 14 is configured to collect data.

The sensor 14 includes or is otherwise operatively associated with a wireless receiver system 30, which is configured to transmit the sensor data to a wireless transmission system 20. The wireless transmission system 20 is of or operatively associated with a data receiver 111, which is any device, component, and/or entity configured to receiver the sensor data from the sensor 14. The wireless transmission system 20 is configured to provide meaningful electrical energy to the sensor 14, via a wireless power signal transmitted from the wireless transmission system 20 to the wireless receiver system 30 via, for example, antennas 21, 31, all of which will be discussed in more detail below with respect to a system 10 for wireless power transfer. The wireless receiver system 30 may receive the sensor data from the associated sensor 14 and encode the sensor data into the wireless power signals as in-band wireless data signals. The wireless transmission system 20, via a controller 28 thereof, and/or an additional or alternative sensor data controller 126 may then decode the sensor data from the in-band wireless data signals. Then, the controller 28, 126 may provide the decoded sensor data to any downstream components of a host or associated device 104. It is to be noted that the sensor data controller 126 may be a common controller as the transmission controller 28 or may be a separate controller.

The sensor data controller 126 may be any electronic controller or computing system that includes, at least, a processor which performs operations, executes control algorithms, stores data, retrieves data, gathers data, controls and/or provides communication with other components and/or subsystems associated with the sensing system 100, and/or performs any other computing or controlling task desired. The sensor data controller 126 may be a single controller or may include more than one controller disposed to control various functions and/or features of the sensing system 100. Functionality of the sensor data controller 126 may be implemented in hardware and/or software and may rely on one or more data maps relating to the operation of the sensing system 100. To that end, the sensor data controller 126 may be operatively associated with memory. The memory may include one or more of internal memory, external memory, and/or remote memory (e.g., a database and/or server operatively connected to the sensor data controller 126 via a network, such as, but not limited to, the Internet). The internal memory and/or external memory may include, but are not limited to including, one or more of a read only memory (ROM), including programmable read-only memory (PROM), erasable programmable read-only memory (EPROM or sometimes but rarely labelled EROM), electrically erasable programmable read-only memory (EEPROM), random access memory (RAM), including dynamic RAM (DRAM), static RAM (SRAM), synchronous dynamic RAM (SDRAM), single data rate synchronous dynamic RAM (SDR SDRAM), double data rate synchronous dynamic RAM (DDR SDRAM, DDR2, DDR3, DDR4), and graphics double data rate synchronous dynamic RAM (GDDR SDRAM, GDDR2, GDDR3, GDDR4, GDDR5, a flash memory, a portable memory, and the like. Such memory media are examples of nontransitory machine readable and/or computer readable memory media.

Referring to FIG. 1A, both the data receiver 111 and the sensing environment 102 may be commonly contained by and/or operatively associated with a common host device 104A. In such a scenario, the sensor 14 may be configured to determine data associated with one or more operating conditions and/or system characteristics associated with the host device 104A and utilize said data for functionality within the host device 104A itself. A non-limiting example of this scenario is if the sensor 14 is a sensor placed within a fluid chamber (sensing environment 102) and the sensor 14 is configured to determine a fluid level within the fluid chamber. In such an example, it may be disadvantageous, within the host device 104A (e.g., a cleaning device including a fluid chamber, a kitchen device including a fluid chamber, a fluid-based automotive component, among other things) to have electrical connectors within a fluid chamber. Thus, by implementing the wireless power/data connection from the sensor 14 to the data receiver 111, the sensor 14 may be placed in a sensing environment 102 that it otherwise would not be placeable. However, the example of this paragraph is merely exemplary and many other sensor/host device combinations are contemplated.

Figure 1B:
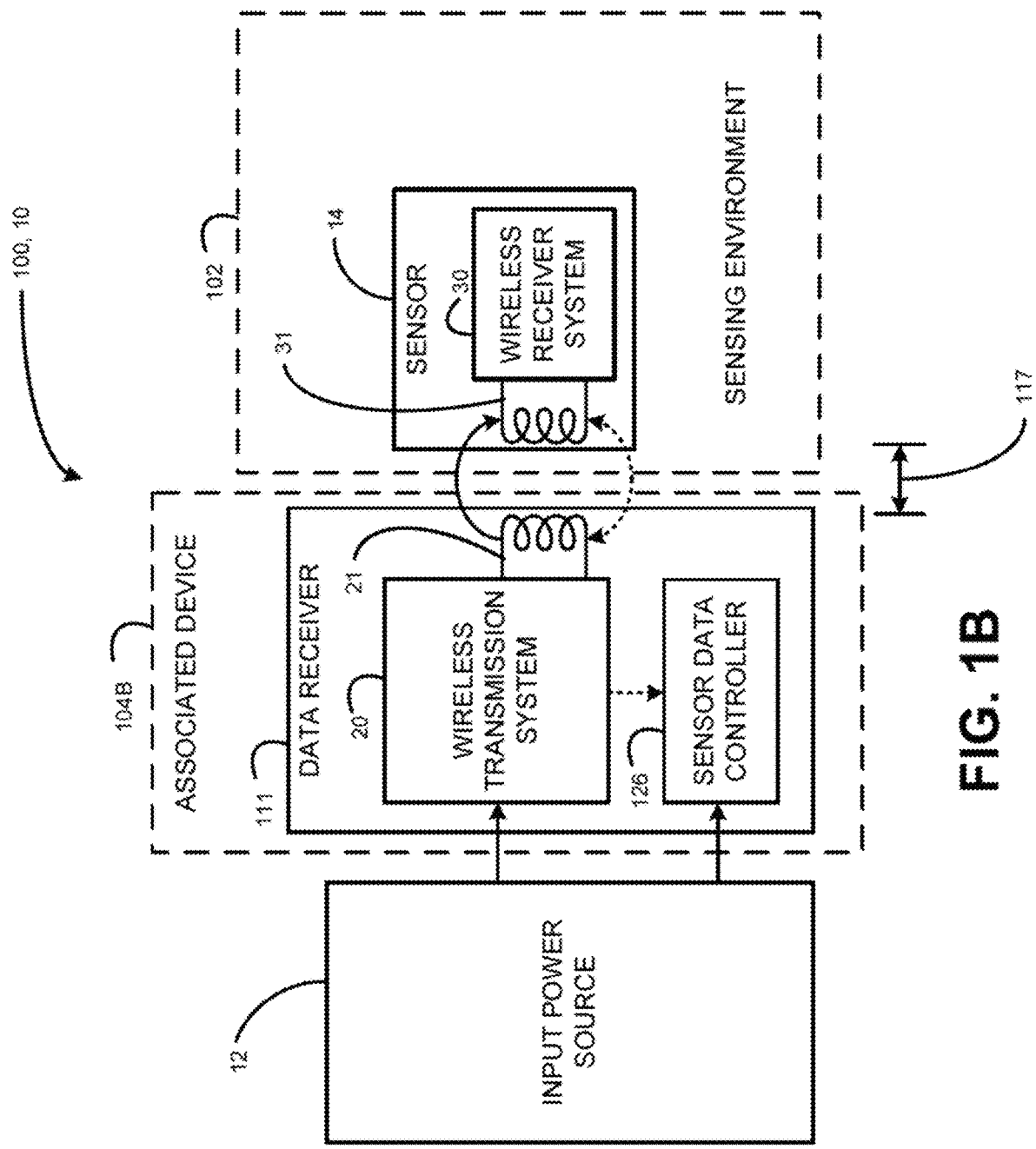
FIG. 1B is a block diagram for a second sensing system, in accordance with the present disclosure.

Referring now to FIG. 1B, in this scenario, the sensor 14 and the sensing environment 102 are external of an associated device 104B, of which the data receiver 111 and/or the wireless transmission system 20 are associated. In such scenarios, the associate device 104B may be positioned proximate to the sensor 14, such that the antennas 21, 31 are capable of coupling, for the purposes of transfer of wireless power and wireless data. A non-limiting example of such a scenario would be if the sensor 14 is a medical sensor and/or medical implant configured to reside, temporarily or permanently, within a human body. In such examples, the associated device 104B may be a computing device or other data collection device including or associated with the wireless transmission system 20. In such examples, if the associated device 104B is positioned proximate to the location of the sensor 14, within the human body, the wireless transmission system 20 may then power the sensor 14 and the sensor 14 may provide sensor data to the associated device 104B. However, the example of this paragraph is merely exemplary and many other sensor/associated device combinations are contemplated.

A "sensor," as defined herein, is any device capable of determining data, operating conditions, physical characteristics, among other data, that is associated with a sensing environment. Example sensors may include, but are not limited to including, an embedded sensor, an Internet of Things (IoT) sensor, a medical sensor, a fitness sensor, a heart-rate sensor, a fluid sensor, a light sensor, a detection sensor, an accelerometer, a motion sensor, a RADAR or LiDAR sensor, a temperature or heat sensor, among other known sensors.

Figure 2:
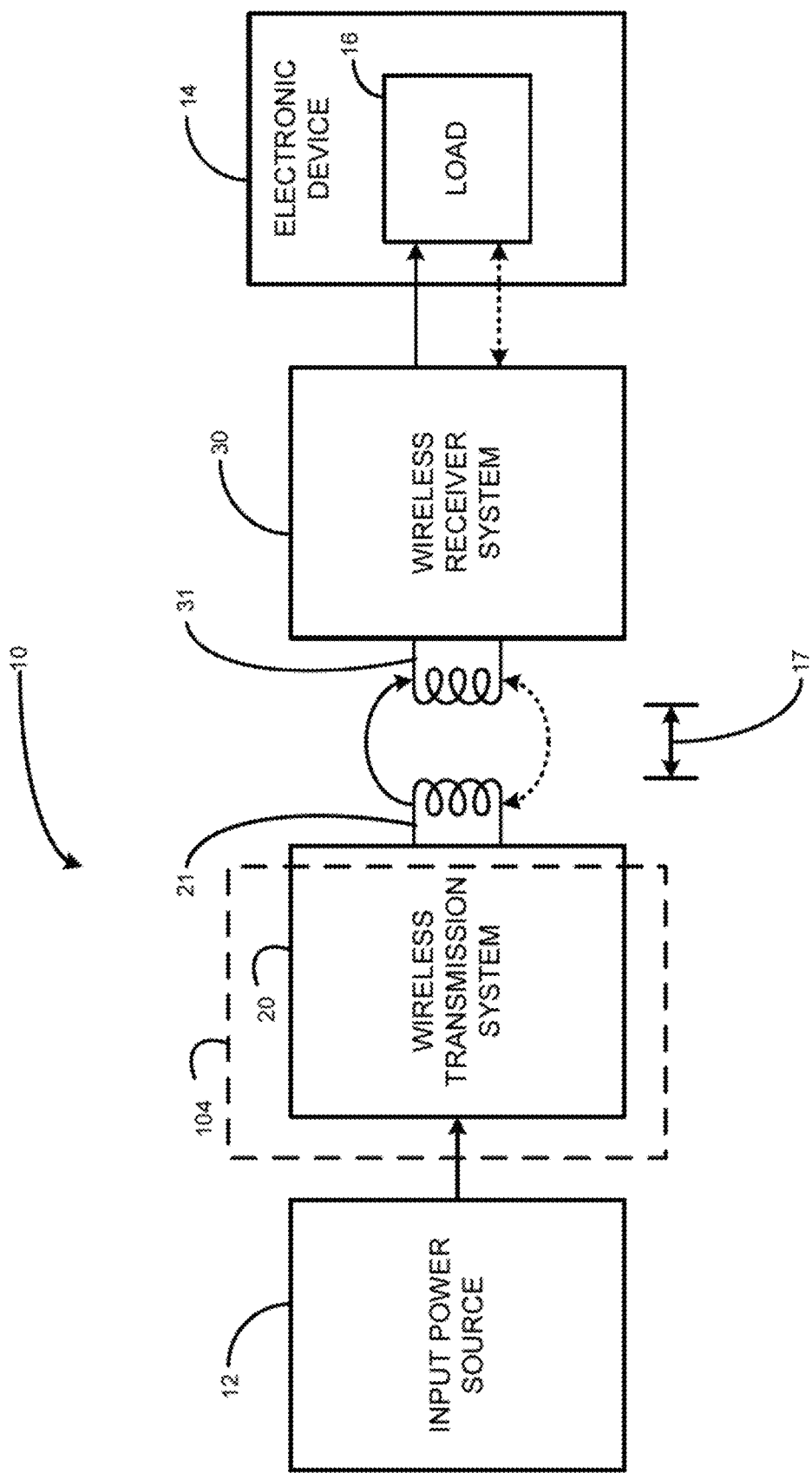
FIG. 2 is a block diagram of an embodiment of a system for wirelessly transferring one or more of electrical energy, electrical power signals, electrical power, electromagnetic energy, electronic data, and combinations thereof, in accordance with the present disclosure.

Turning now to FIG. 2, the wireless power transfer system 10 is illustrated. The wireless power transfer system 10 provides for the wireless transmission of electrical signals, such as, but not limited to, electrical energy, electrical power, electrical power signals, electromagnetic energy, and electronically transmittable data ("electronic data"). As used herein, the term "electrical power signal" refers to an electrical signal transmitted specifically to provide meaningful electrical energy for charging and/or directly powering a load, whereas the term "electronic data signal" refers to an electrical signal that is utilized to convey data across a medium.

The wireless power transfer system 10 provides for the wireless transmission of electrical signals via near field magnetic coupling. As shown in the embodiment of FIG. 1, the wireless power transfer system 10 includes one or more wireless transmission systems 20 and one or more wireless receiver systems 30. A wireless receiver system 30 is configured to receive electrical signals from, at least, a wireless transmission system 20.

As illustrated, the wireless transmission system(s) 20 and wireless receiver system(s) 30 may be configured to transmit electrical signals across, at least, a separation distance or gap 17. A separation distance or gap, such as the gap 17, in the context of a wireless power transfer system, such as the system 10, does not include a physical connection, such as a wired connection. There may be intermediary objects located in a separation distance or gap, such as, but not limited to, air, a counter top, a casing for an electronic device, a plastic filament, an insulator, a mechanical wall, among other things; however, there is no physical, electrical connection at such a separation distance or gap.

Thus, the combination of two or more wireless transmission systems 20 and wireless receiver system 30 create an electrical connection without the need for a physical connection. As used herein, the term "electrical connection" refers to any facilitation of a transfer of an electrical current, voltage, and/or power from a first location, device, component, and/or source to a second location, device, component, and/or destination. An "electrical connection" may be a physical connection, such as, but not limited to, a wire, a trace, a via, among other physical electrical connections, connecting a first location, device, component, and/or source to a second location, device, component, and/or destination. Additionally or alternatively, an "electrical connection" may be a wireless power and/or data transfer, such as, but not limited to, magnetic, electromagnetic, resonant, and/or inductive field, among other wireless power and/or data transfers, connecting a first location, device, component, and/or source to a second location, device, component, and/or destination.

Figure 3:
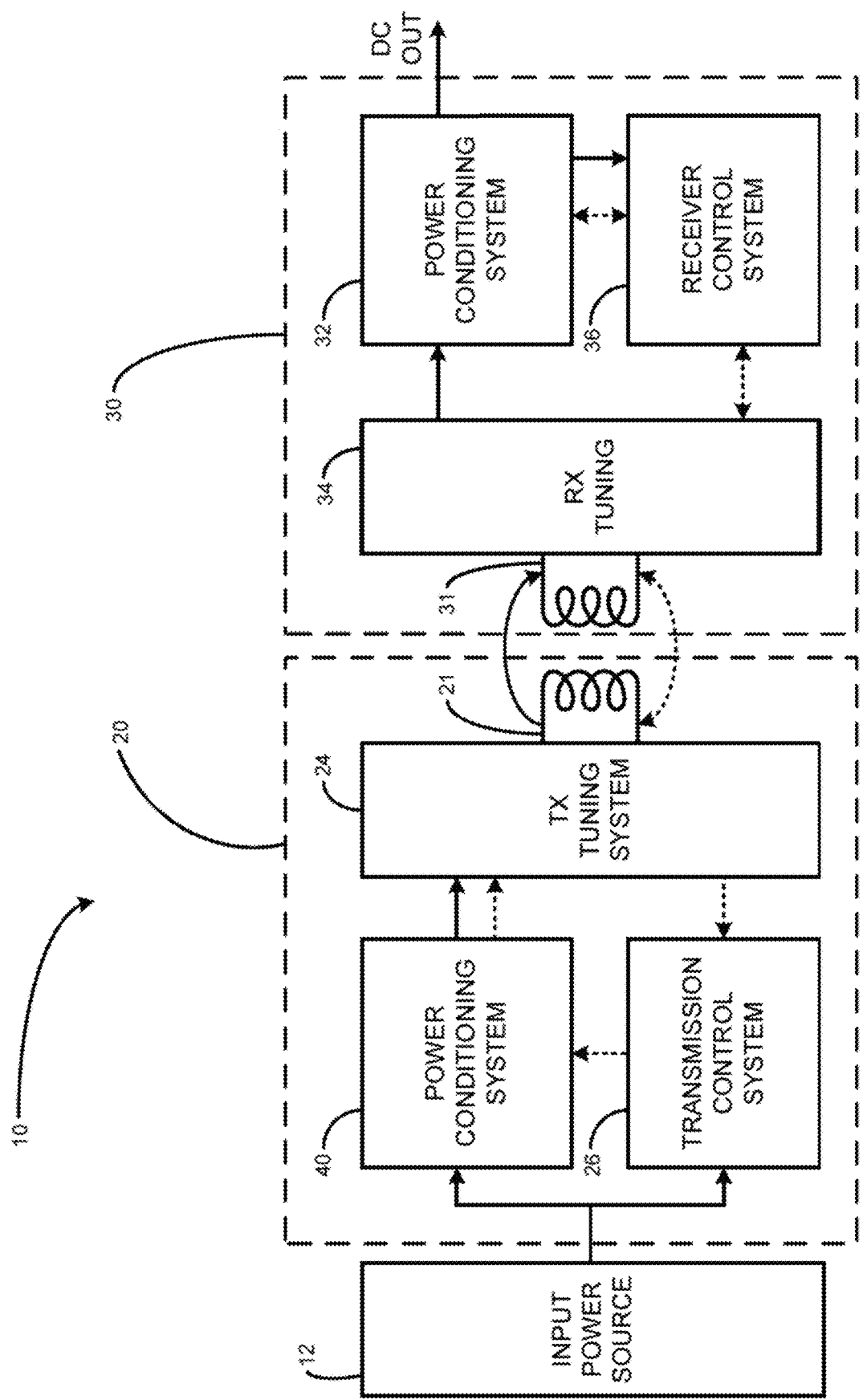
FIG. 3 is a block diagram illustrating components of a wireless transmission system of FIG. 2 and a wireless receiver system of FIG. 2, in accordance with FIGS. 1, 2 and the present disclosure.

Further, while FIGS. 2-3 may depict wireless power signals and wireless data signals transferring only from one antenna (e.g., a transmission antenna 21) to another antenna (e.g., a receiver antenna 31 and/or a transmission antenna 21), it is certainly possible that a transmitting antenna 21 may transfer electrical signals and/or couple with one or more other antennas and transfer, at least in part, components of the output signals or magnetic fields of the transmitting antenna 21. Such transmission may include secondary and/or stray coupling or signal transfer to multiple antennas of the system 10.

In some cases, the gap 17 may also be referenced as a "Z-Distance," because, if one considers an antenna 21, 31 each to be disposed substantially along respective common X-Y planes, then the distance separating the antennas 21, 31 is the gap in a "Z" or "depth" direction. However, flexible and/or non-planar coils are certainly contemplated by embodiments of the present disclosure and, thus, it is contemplated that the gap 17 may not be uniform, across an envelope of connection distances between the antennas 21, 31. It is contemplated that various tunings, configurations, and/or other parameters may alter the possible maximum distance of the gap 17, such that electrical transmission from the wireless transmission system 20 to the wireless receiver system 30 remains possible.

The wireless power transfer system 10 operates when the wireless transmission system 20 and the wireless receiver system 30 are coupled. As used herein, the terms "couples," "coupled," and "coupling" generally refer to magnetic field coupling, which occurs when a transmitter and/or any components thereof and a receiver and/or any components thereof are coupled to each other through a magnetic field. Such coupling may include coupling, represented by a coupling coefficient (k), that is at least sufficient for an induced electrical power signal, from a transmitter, to be harnessed by a receiver. Coupling of the wireless transmission system 20 and the wireless receiver system 30, in the system 10, may be represented by a resonant coupling coefficient of the system 10 and, for the purposes of wireless power transfer, the coupling coefficient for the system 10 may be in the range of about 0.01 and 0.9.

As illustrated, at least one wireless transmission system 20 is associated with an input power source 12. The input power source 12 may be operatively associated with the host or associated device 104, which may be any electrically operated device, circuit board, electronic assembly, dedicated charging device, or any other contemplated electronic device. Example host devices, with which the wireless transmission system 20 may be associated therewith, include, but are not limited to including, a device that includes an integrated circuit, a portable computing device, storage medium for electronic devices, charging apparatus for one or multiple electronic devices, dedicated electrical charging devices, among other contemplated electronic devices.

The input power source 12 may be or may include one or more electrical storage devices, such as an electrochemical cell, a battery pack, and/or a capacitor, among other storage devices. Additionally or alternatively, the input power source 12 may be any electrical input source (e.g., any alternating current (AC) or direct current (DC) delivery port) and may include connection apparatus from said electrical input source to the wireless transmission system 20 (e.g., transformers, regulators, conductive conduits, traces, wires, or equipment, goods, computer, camera, mobile phone, and/or other electrical device connection ports and/or adaptors, such as but not limited to USB ports and/or adaptors, among other contemplated electrical components).

Electrical energy received by the wireless transmission system(s) 20 is then used for at least two purposes: to provide electrical power to internal components of the wireless transmission system 20 and to provide electrical power to the transmission antenna 21. The transmission antenna 21 is configured to wirelessly transmit the electrical signals conditioned and modified for wireless transmission by the wireless transmission system 20 via near-field magnetic coupling (NFMC). Near-field magnetic coupling enables the transfer of signals wirelessly through magnetic induction between the transmission antenna 21 and one or more of receiving antenna 31 of, or associated with, the wireless receiver system 30, another transmission antenna 21, or combinations thereof. Near-field magnetic coupling may be and/or referred to as "inductive coupling," which, as used herein, is a wireless power transmission technique that utilizes an alternating electromagnetic field to transfer electrical energy between two antennas. Such inductive coupling is the near field wireless transmission of magnetic energy between two magnetically coupled coils that are tuned to resonate at a similar frequency. Accordingly, such near-field magnetic coupling may enable efficient wireless power transmission via resonant transmission of confined magnetic fields. Further, such near-field magnetic coupling may provide connection via "mutual inductance," which, as defined herein is the production of an electromotive force in a circuit by a change in current in a second circuit magnetically coupled to the first.

In one or more embodiments, the inductor coils of either the transmission antenna 21 or the receiver antenna 31 are strategically positioned to facilitate reception and/or transmission of wirelessly transferred electrical signals through near field magnetic induction. Antenna operating frequencies may comprise relatively high operating frequency ranges, examples of which may include, but are not limited to, 6.78 MHZ (e.g., in accordance with the Rezence and/or Airfuel interface standard and/or any other proprietary interface standard operating at a frequency of 6.78 MHZ), 13.56 MHZ (e.g., in accordance with the NFC standard, defined by ISO/IEC standard 18092), 27 MHz, and/or an operating frequency of another proprietary operating mode. The operating frequencies of the antennas 21, 31 may be operating frequencies designated by the International Telecommunications Union (ITU) in the Industrial, Scientific, and Medical (ISM) frequency bands, including not limited to 6.78 MHz, 13.56 MHz, and 27 MHz, which are designated for use in wireless power transfer.

The transmitting antenna and the receiving antenna of the present disclosure may be configured to transmit and/or receive electrical power having a magnitude that ranges from about 10 milliwatts (mW) to about 500 watts (W). In one or more embodiments the inductor coil of the transmitting antenna 21 is configured to resonate at a transmitting antenna resonant frequency or within a transmitting antenna resonant frequency band.

As known to those skilled in the art, a "resonant frequency" or "resonant frequency band" refers a frequency or frequencies wherein amplitude response of the antenna is at a relative maximum, or, additionally or alternatively, the frequency or frequency band where the capacitive reactance has a magnitude substantially similar to the magnitude of the inductive reactance. In one or more embodiments, the transmitting antenna resonant frequency is at a high frequency, as known to those in the art of wireless power transfer.

The wireless receiver system 30 may be associated with the sensor 14. Example embodiments of the sensor 14 are discussed above.

For the purposes of illustrating the features and characteristics of the disclosed embodiments, arrow-ended lines are utilized to illustrate transferrable and/or communicative signals and various patterns are used to illustrate electrical signals that are intended for power transmission and electrical signals that are intended for the transmission of data and/or control instructions. Solid lines indicate signal transmission of electrical energy over a physical and/or wireless power transfer, in the form of power signals that are, ultimately, utilized in wireless power transmission from the wireless transmission system 20 to the wireless receiver system 30. Further, dotted lines are utilized to illustrate electronically transmittable data signals, which ultimately may be wirelessly transmitted from the wireless transmission system 20 to the wireless receiver system 30.

While the systems and methods herein illustrate the transmission of wirelessly transmitted energy, wireless power signals, wirelessly transmitted power, wirelessly transmitted electromagnetic energy, and/or electronically transmittable data, it is certainly contemplated that the systems, methods, and apparatus disclosed herein may be utilized in the transmission of only one signal, various combinations of two signals, or more than two signals and, further, it is contemplated that the systems, method, and apparatus disclosed herein may be utilized for wireless transmission of other electrical signals in addition to or uniquely in combination with one or more of the above mentioned signals. In some examples, the signal paths of solid or dotted lines may represent a functional signal path, whereas, in practical application, the actual signal is routed through additional components en route to its indicated destination. For example, it may be indicated that a data signal routes from a communications apparatus to another communications apparatus; however, in practical application, the data signal may be routed through an amplifier, then through a transmission antenna, to a receiver antenna, where, on the receiver end, the data signal is decoded by a respective communications device of the receiver.

Turning now to FIG. 3, the wireless power transfer system 10 is illustrated as a block diagram including example sub-systems of both the wireless transmission systems 20 and the wireless receiver systems 30. The wireless transmission systems 20 may include, at least, a power conditioning system 40, a transmission control system 26, a demodulation circuit 70, a transmission tuning system 24, and the transmission antenna 21. A first portion of the electrical energy input from the input power source 12 may be configured to electrically power components of the wireless transmission system 20 such as, but not limited to, the transmission control system 26. A second portion of the electrical energy input from the input power source 12 is conditioned and/or modified for wireless power transmission, to the wireless receiver system 30, via the transmission antenna 21. Accordingly, the second portion of the input energy is modified and/or conditioned by the power conditioning system 40. While not illustrated, it is certainly contemplated that one or both of the first and second portions of the input electrical energy may be modified, conditioned, altered, and/or otherwise changed prior to receipt by the power conditioning system 40 and/or transmission control system 26, by further contemplated subsystems (e.g., a voltage regulator, a current regulator, switching systems, fault systems, safety regulators, among other things).

Figure 4:
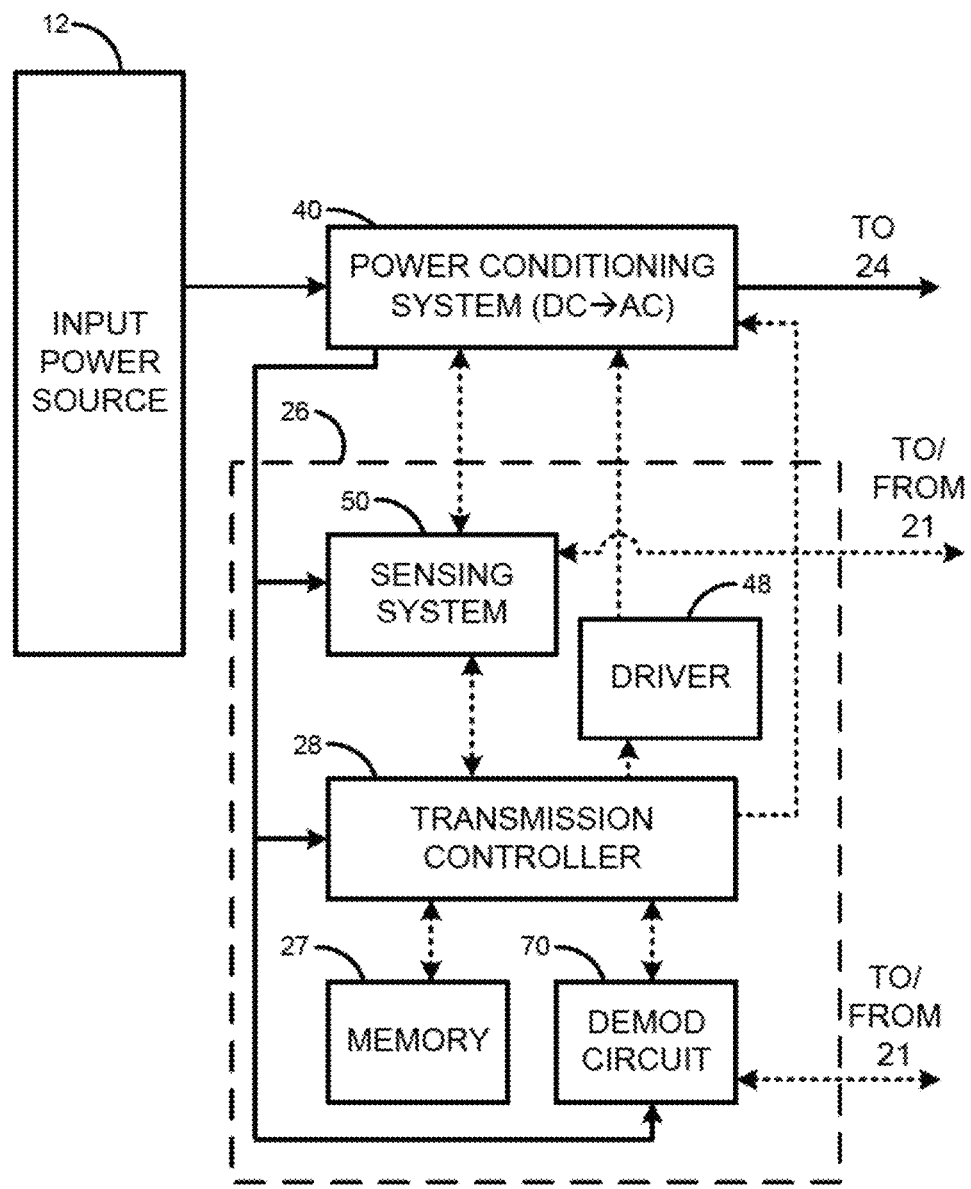
FIG. 4 is a block diagram illustrating components of a transmission control system of the wireless transmission system of FIG. 3, in accordance with FIG. 1, FIG. 2, and the present disclosure.

Referring now to FIG. 4, with continued reference to FIGS. 1-3, subcomponents and/or systems of the transmission control system 26 are illustrated. The transmission control system 26 may include a transmission (Tx) sensing system 50, a transmission controller 28, a communications system 29, a driver 48, and a memory 27.

The transmission controller 28 may be any electronic controller or computing system that includes, at least, a processor which performs operations, executes control algorithms, stores data, retrieves data, gathers data, controls and/or provides communication with other components and/or subsystems associated with the wireless transmission system 20, and/or performs any other computing or controlling task desired. The transmission controller 28 may be a single controller or may include more than one controller disposed to control various functions and/or features of the wireless transmission system 20. Functionality of the transmission controller 28 may be implemented in hardware and/or software and may rely on one or more data maps relating to the operation of the wireless transmission system 20. To that end, the transmission controller 28 may be operatively associated with the memory 27. The memory may include one or more of internal memory, external memory, and/or remote memory (e.g., a database and/or server operatively connected to the transmission controller 28 via a network, such as, but not limited to, the Internet). The internal memory and/or external memory may include, but are not limited to including, one or more of a read only memory (ROM), including programmable read-only memory (PROM), erasable programmable read-only memory (EPROM or sometimes but rarely labelled EROM), electrically erasable programmable read-only memory (EEPROM), random access memory (RAM), including dynamic RAM (DRAM), static RAM (SRAM), synchronous dynamic RAM (SDRAM), single data rate synchronous dynamic RAM (SDR SDRAM), double data rate synchronous dynamic RAM (DDR SDRAM, DDR2, DDR3, DDR4), and graphics double data rate synchronous dynamic RAM (GDDR SDRAM, GDDR2, GDDR3, GDDR4, GDDR5, a flash memory, a portable memory, and the like. Such memory media are examples of nontransitory machine readable and/or computer readable memory media.

While particular elements of the transmission control system 26 are illustrated as independent components and/or circuits (e.g., the driver 48, the memory 27, the communications system 29, the sensing system 50, among other contemplated elements) of the transmission control system 26, such components may be integrated with the transmission controller 28. In some examples, the transmission controller 28 may be an integrated circuit configured to include functional elements of one or both of the transmission controller 28 and the wireless transmission system 20, generally.

As illustrated, the transmission controller 28 is in operative association, for the purposes of data transmission, receipt, and/or communication, with, at least, the memory 27, the communications system 29, the power conditioning system 40, the driver 48, and the Tx sensing system 50. The driver 48 may be implemented to control, at least in part, the operation of the power conditioning system 40. In some examples, the driver 48 may receive instructions from the transmission controller 28 to generate and/or output a generated pulse width modulation (PWM) signal to the power conditioning system 40. In some such examples, the PWM signal may be configured to drive the power conditioning system 40 to output electrical power as an alternating current signal, having an operating frequency defined by the PWM signal. In some examples, PWM signal may be configured to generate a duty cycle for the AC power signal output by the power conditioning system 40. In some such examples, the duty cycle may be configured to be about 50% of a given period of the AC power signal.

The Tx sensing system 50 may include one or more transmission (Tx) sensors, wherein each Tx sensor may be operatively associated with one or more components of the wireless transmission system 20 and configured to provide information and/or data. The term "Tx sensor" is used in its broadest interpretation to define one or more components operatively associated with the wireless transmission system 20 that operate to sense functions, conditions, electrical characteristics, operations, and/or operating characteristics of one or more of the wireless transmission system 20, the wireless receiving system 30, the input power source 12, the host device 11, the transmission antenna 21, the receiver antenna 31, along with any other components and/or subcomponents thereof.

Figure 5:
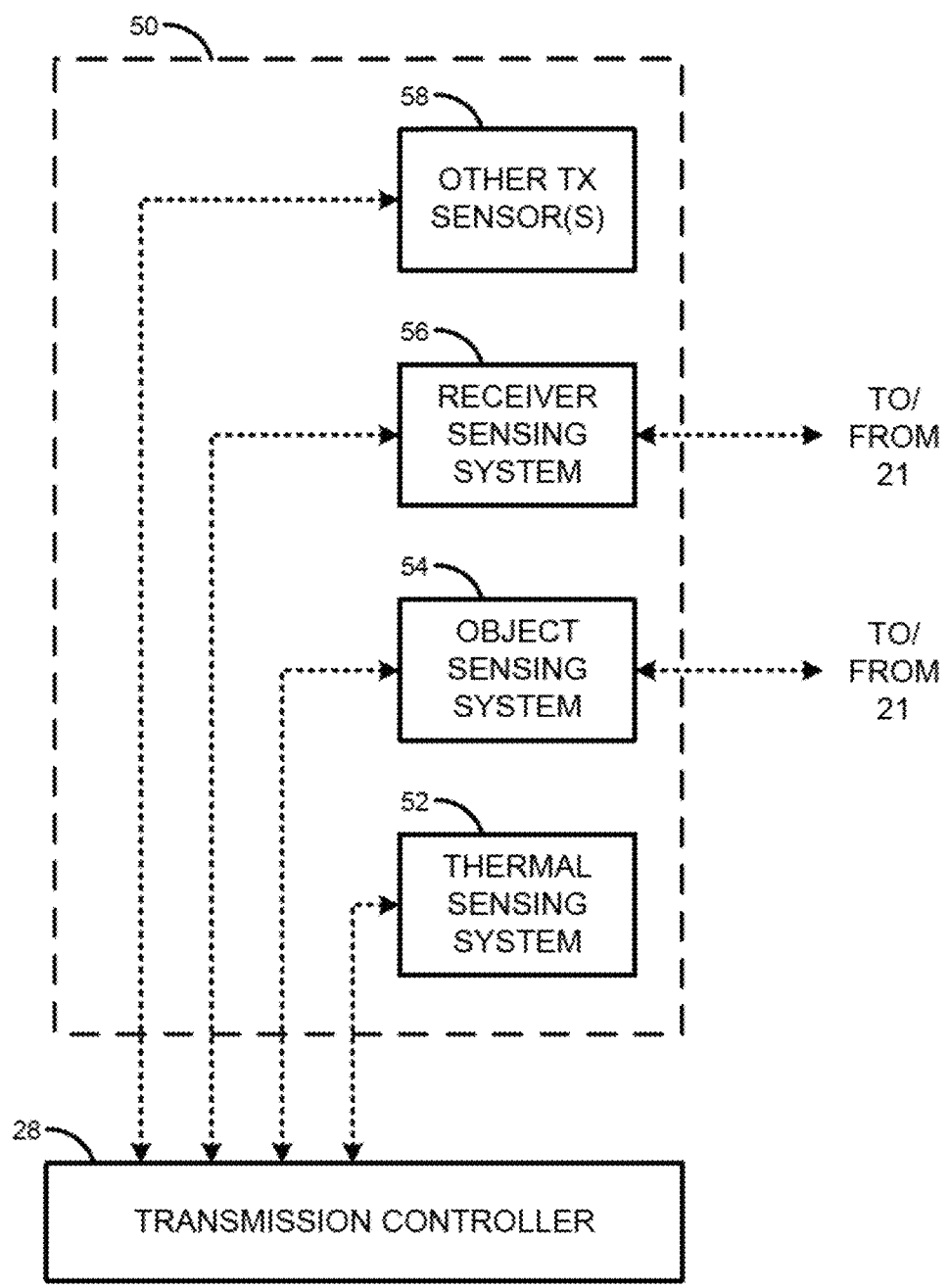
FIG. 5 is a block diagram illustrating components of a sensing system of the transmission control system of FIG. 4, in accordance with FIGS. 1-4 and the present disclosure.

As illustrated in the embodiment of FIG. 5, the Tx sensing system 50 may include, but is not limited to including, a thermal sensing system 52, an object sensing system 54, a receiver sensing system 56, a current sensor 57, and/or any other sensor(s) 58. Within these systems, there may exist even more specific optional additional or alternative Tx sensing systems addressing particular sensing aspects required by an application, such as, but not limited to: a condition-based maintenance sensing system, a performance optimization sensing system, a state-of-charge sensing system, a temperature management sensing system, a component heating sensing system, an IoT sensing system, an energy and/or power management sensing system, an impact detection sensing system, an electrical status sensing system, a speed detection sensing system, a device health sensing system, among others. The object sensing system 54, may be a foreign object detection (FOD) system.

Each of the thermal sensing system 52, the object sensing system 54, the receiver sensing system 56, the current sensor 57 and/or the other sensor(s) 58, including the optional additional or alternative systems, are operatively and/or communicatively connected to the transmission controller 28. The thermal sensing system 52 is configured to monitor ambient and/or component temperatures within the wireless transmission system 20 or other elements nearby the wireless transmission system 20. The thermal sensing system 52 may be configured to detect a temperature within the wireless transmission system 20 and, if the detected temperature exceeds a threshold temperature, the transmission controller 28 prevents the wireless transmission system 20 from operating. Such a threshold temperature may be configured for safety considerations, operational considerations, efficiency considerations, and/or any combinations thereof. In a non-limiting example, if, via input from the thermal sensing system 52, the transmission controller 28 determines that the temperature within the wireless transmission system 20 has increased from an acceptable operating temperature to an undesired operating temperature (e.g., in a non-limiting example, the internal temperature increasing from about 20° Celsius (C) to about 50° C., the transmission controller 28 prevents the operation of the wireless transmission system 20 and/or reduces levels of power output from the wireless transmission system 20. In some non-limiting examples, the thermal sensing system 52 may include one or more of a thermocouple, a thermistor, a negative temperature coefficient (NTC) resistor, a resistance temperature detector (RTD), and/or any combinations thereof.

As depicted in FIG. 5, the Tx sensing system 50 may include the object sensing system 54. The object sensing system 54 may be configured to detect one or more of the wireless receiver system 30 and/or the receiver antenna 31, thus indicating to the transmission controller 28 that the receiver system 30 is proximate to the wireless transmission system 20. Additionally or alternatively, the object sensing system 54 may be configured to detect presence of unwanted objects in contact with or proximate to the wireless transmission system 20. In some examples, the object sensing system 54 is configured to detect the presence of an undesired object. In some such examples, if the transmission controller 28, via information provided by the object sensing system 54, detects the presence of an undesired object, then the transmission controller 28 prevents or otherwise modifies operation of the wireless transmission system 20. In some examples, the object sensing system 54 utilizes an impedance change detection scheme, in which the transmission controller 28 analyzes a change in electrical impedance observed by the transmission antenna 20 against a known, acceptable electrical impedance value or range of electrical impedance values.

Additionally or alternatively, the object sensing system 54 may utilize a quality factor (Q) change detection scheme, in which the transmission controller 28 analyzes a change from a known quality factor value or range of quality factor values of the object being detected, such as the receiver antenna 31. The "quality factor" or "Q" of an inductor can be defined as (frequency (Hz)×inductance (H))/resistance (ohms), where frequency is the operational frequency of the circuit, inductance is the inductance output of the inductor and resistance is the combination of the radiative and reactive resistances that are internal to the inductor. "Quality factor," as defined herein, is generally accepted as an index (figure of measure) that measures the efficiency of an apparatus like an antenna, a circuit, or a resonator. In some examples, the object sensing system 54 may include one or more of an optical sensor, an electro-optical sensor, a Hall effect sensor, a proximity sensor, and/or any combinations thereof. In some examples, the quality factor measurements, described above, may be performed when the wireless power transfer system 10 is performing in band communications.

The receiver sensing system 56 is any sensor, circuit, and/or combinations thereof configured to detect presence of any wireless receiving system that may be couplable with the wireless transmission system 20. In some examples, the receiver sensing system 56 and the object sensing system 54 may be combined, may share components, and/or may be embodied by one or more common components. In some examples, if the presence of any such wireless receiving system is detected, wireless transmission of electrical energy, electrical power, electromagnetic energy, and/or data by the wireless transmission system 20 to said wireless receiving system is enabled. In some examples, if the presence of a wireless receiver system is not detected, continued wireless transmission of electrical energy, electrical power, electromagnetic energy, and/or data is prevented from occurring. Accordingly, the receiver sensing system 56 may include one or more sensors and/or may be operatively associated with one or more sensors that are configured to analyze electrical characteristics within an environment of or proximate to the wireless transmission system 20 and, based on the electrical characteristics, determine presence of a wireless receiver system 30.

The current sensor 57 may be any sensor configured to determine electrical information from an electrical signal, such as a voltage or a current, based on a current reading at the current sensor 57. Components of an example current sensor 57 are further illustrated in FIG. 5, which is a block diagram for the current sensor 57. The current sensor 57 may include a transformer 51, a rectifier 53, and/or a low pass filter 55, to process the AC wireless signals, transferred via coupling between the wireless receiver system(s) 20 and wireless transmission system(s) 30, to determine or provide information to derive a current ($I_{Tx}$) or voltage ($V_{Tx}$) at the transmission antenna 21. The transformer 51 may receive the AC wireless signals and either step up or step down the voltage of the AC wireless signal, such that it can properly be processed by the current sensor. The rectifier 53 may receive the transformed AC wireless signal and rectify the signal, such that any negative remaining in the transformed AC wireless signal are either eliminated or converted to opposite positive voltages, to generate a rectified AC wireless signal. The low pass filter 55 is configured to receive the rectified AC wireless signal and filter out AC components (e.g., the operating or carrier frequency of the AC wireless signal) of the rectified AC wireless signal, such that a DC voltage is output for the current ($I_{Tx}$) and/or voltage ($V_{Tx}$) at the transmission antenna 21.

Figure 6:
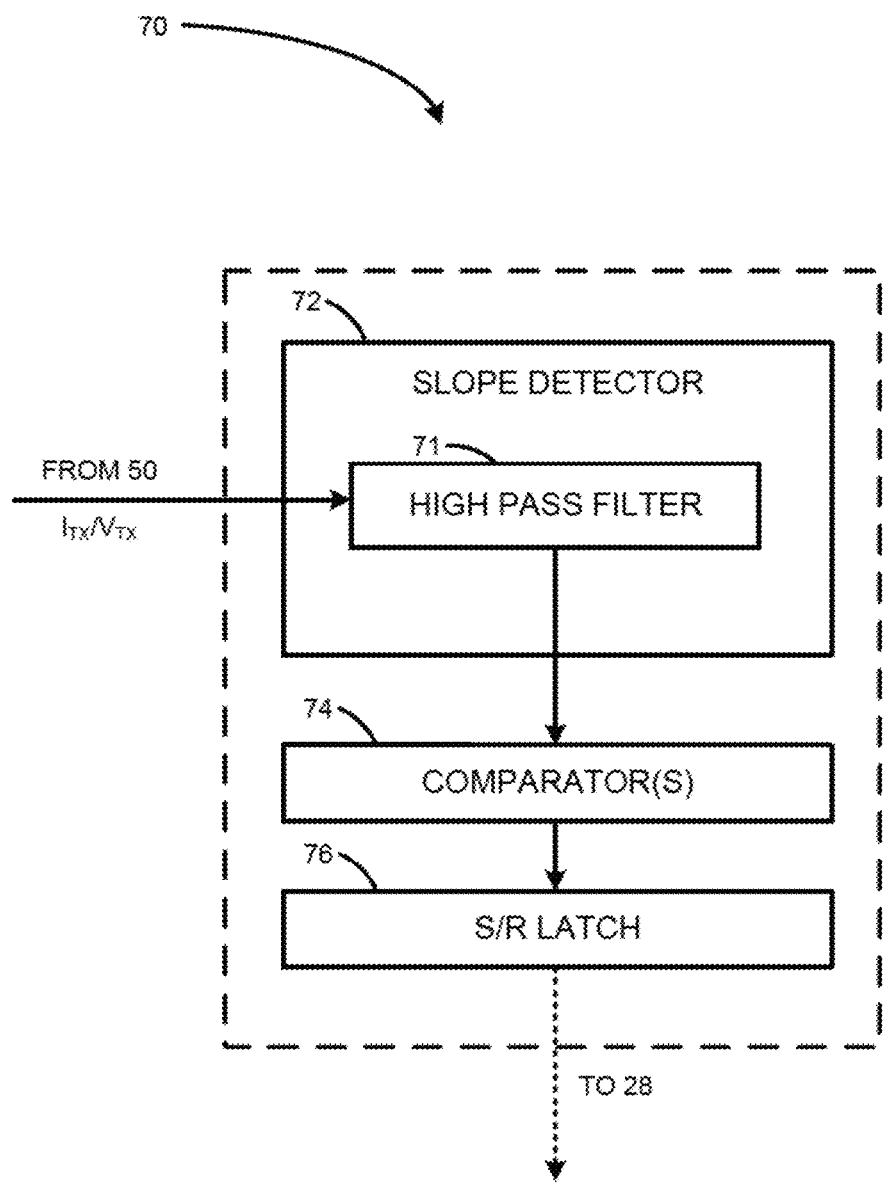
FIG. 6 is a block diagram for an example low pass filter of the sensing system of FIG. 5, in accordance with FIGS. 1-5 and the present disclosure.

FIG. 6 is a block diagram for a demodulation circuit 70 for the wireless transmission system(s) 20, which is used by the wireless transmission system 20 to simplify or decode components of wireless data signals of an alternating current (AC) wireless signal, prior to transmission of the wireless data signal to the transmission controller 28. The demodulation circuit includes, at least, a slope detector 72 and a comparator 74. In some examples, the demodulation circuit 70 includes a set/reset (SR) latch 76. In some examples, the demodulation circuit 70 may be an analog circuit comprised of one or more passive components (e.g., resistors, capacitors, inductors, diodes, among other passive components) and/or one or more active components (e.g., operational amplifiers, logic gates, among other active components). Alternatively, it is contemplated that the demodulation circuit 70 and some or all of its components may be implemented as an integrated circuit (IC). In either an analog circuit or IC, it is contemplated that the demodulation circuit may be external of the transmission controller 28 and is configured to provide information associated with wireless data signals transmitted from the wireless receiver system 30 to the wireless transmission system 20.

The demodulation circuit 70 is configured to receive electrical information (e.g., $I_{Tx}$, $V_{Tx}$) from at least one sensor (e.g., a sensor of the sensing system 50), detect a change in such electrical information, determine if the change in the electrical information meets or exceeds one of a rise threshold or a fall threshold. If the change exceeds one of the rise threshold or the fall threshold, the demodulation circuit 70 generates an alert, and, output a plurality of data alerts. Such data alerts are received by the transmitter controller 28 and decoded by the transmitter controller 28 to determine the wireless data signals. In other words, the demodulation circuit 70 is configured to monitor the slope of an electrical signal (e.g., slope of a voltage at the power conditioning system 32 of a wireless receiver system 30) and output an alert if said slope exceeds a maximum slope threshold or undershoots a minimum slope threshold.

Such slope monitoring and/or slope detection by the communications system 70 is particularly useful when detecting or decoding an amplitude shift keying (ASK) signal that encodes the wireless data signals in-band of the wireless power signal at the operating frequency. In an ASK signal, the wireless data signals are encoded by damping the voltage of the magnetic field between the wireless transmission system 20 and the wireless receiver system 30. Such damping and subsequent re-rising of the voltage in the field is performed based on an encoding scheme for the wireless data signals (e.g., binary coding, Manchester coding, pulse-width modulated coding, among other known or novel coding systems and methods). The receiver of the wireless data signals (e.g., the wireless transmission system 20) must then detect rising and falling edges of the voltage of the field and decode said rising and falling edges to receive the wireless data signals.

While in a theoretical, ideal scenario, an ASK signal will rise and fall instantaneously, with no slope between the high voltage and the low voltage for ASK modulation; however, in physical reality, there is some time that passes when the ASK signal transitions from the "high" voltage to the "low" voltage. Thus, the voltage or current signal sensed by the demodulation circuit 70 will have some, knowable slope or rate of change in voltage when transitioning from the high ASK voltage to the low ASK voltage. By configuring the demodulation circuit 70 to determine when said slope meets, overshoots and/or undershoots such rise and fall thresholds, known for the slope when operating in the system 10, the demodulation circuit 70 can accurately detect rising and falling edges of the ASK signal.

Thus, a relatively inexpensive and/or simplified circuit may be utilized to, at least partially, decode ASK signals down to alerts for rising and falling instances. So long as the transmission controller 28 is programmed to understand the coding schema of the ASK modulation, the transmission controller 28 will expend far less computational resources than it would if it had to decode the leading and falling edges directly from an input current or voltage sense signal from the sensing system 50. To that end, as the computational resources required by the transmission controller 28 to decode the wireless data signals are significantly decreased due to the inclusion of the demodulation circuit 70, the demodulation circuit 70 may significantly reduce BOM of the wireless transmission system 20, by allowing usage of cheaper, less computationally capable processor(s) for or with the transmission controller 28.

The demodulation circuit 70 may be particularly useful in reducing the computational burden for decoding data signals, at the transmitter controller 28, when the ASK wireless data signals are encoded/decoded utilizing a pulse-width encoded ASK signals, in-band of the wireless power signals. A pulse-width encoded ASK signal refers to a signal wherein the data is encoded as a percentage of a period of a signal. For example, a two-bit pulse width encoded signal may encode a start bit as 20% of a period between high edges of the signal, encode "1" as 40% of a period between high edges of the signal, and encode "0" as 60% of a period between high edges of the signal, to generate a binary encoding format in the pulse width encoding scheme. Thus, as the pulse width encoding relies solely on monitoring rising and falling edges of the ASK signal, the periods between rising times need not be constant and the data signals may be asynchronous or "unclocked." Examples of pulse width encoding and systems and methods to perform such pulse width encoding are explained in greater detail in U.S. patent application Ser. No. 16/735,342 titled "Systems and Methods for Wireless Power Transfer Including Pulse Width Encoded Data Communications," to Michael Katz, which is commonly owned by the owner of the instant application and is hereby incorporated by reference.

Figure 7:
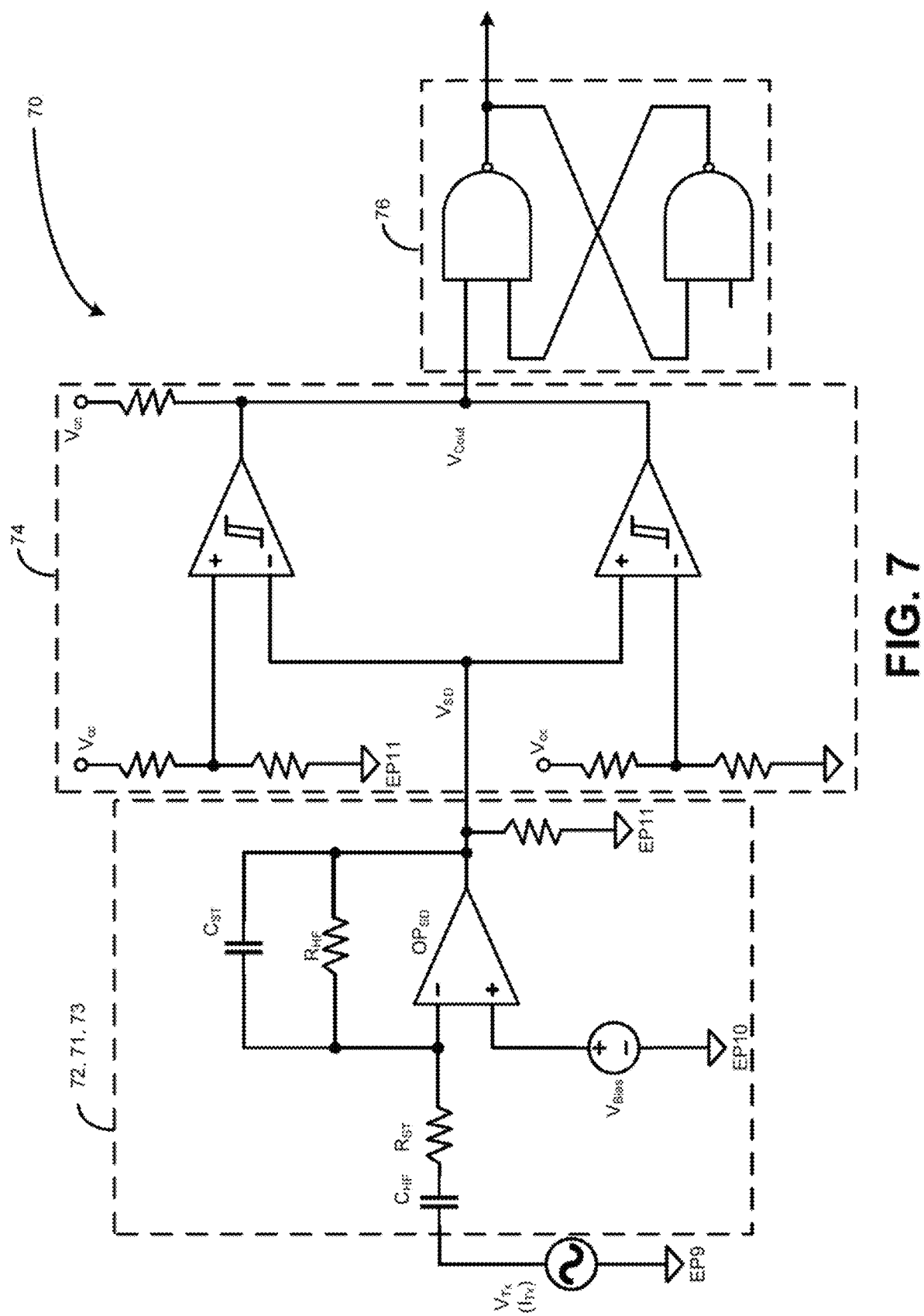
FIG. 7 is a block diagram illustrating components of a demodulation circuit for the wireless transmission system of FIGS. 3, in accordance with FIGS. 1-6 and the present disclosure.
Figure 8:
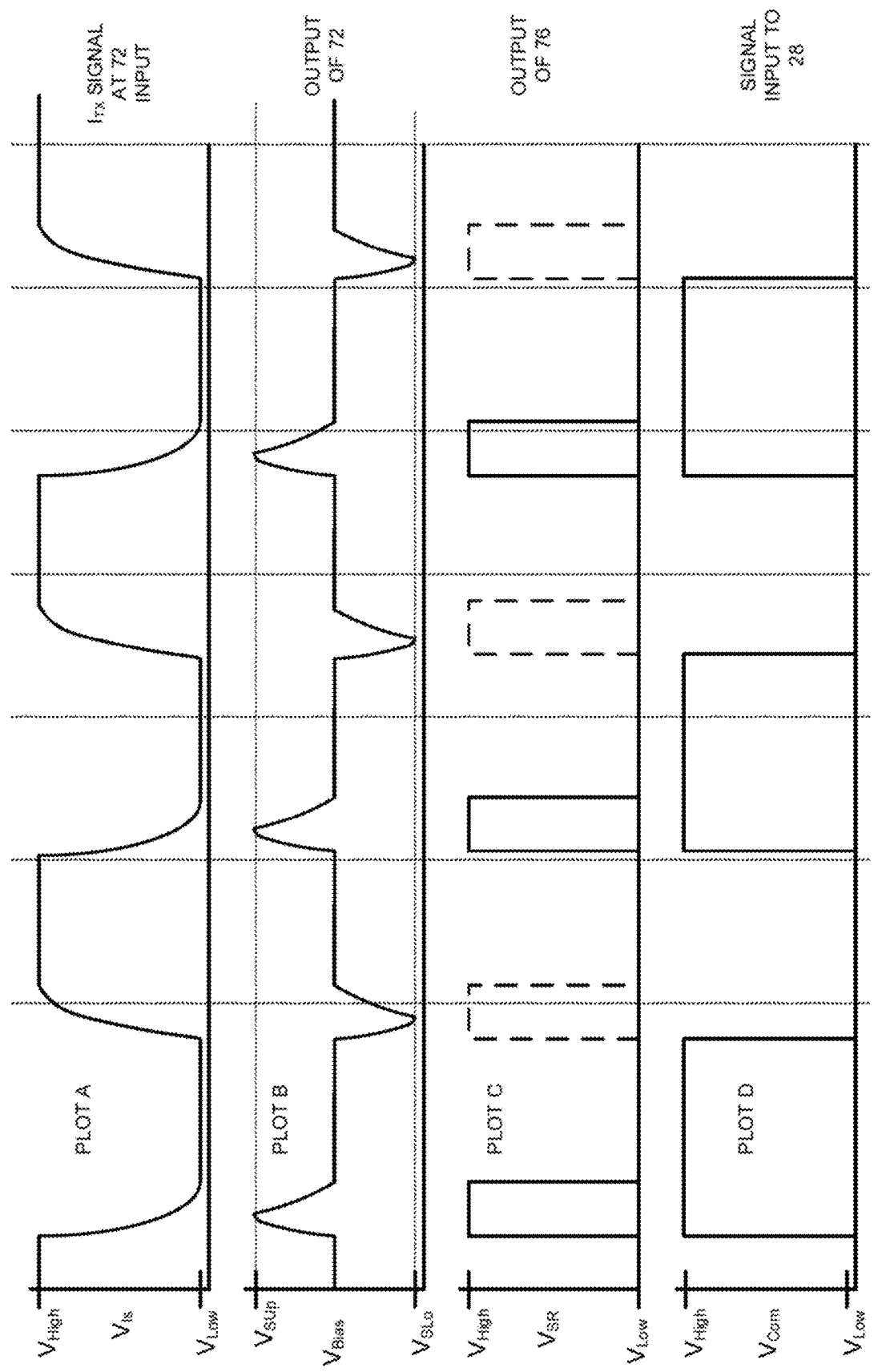
FIG. 8 is an electrical schematic diagram for the demodulation circuit of FIG. 7, in accordance with FIG. 17 and the present disclosure.

Turning now to FIG. 7, with continued reference to FIG. 6, an electrical schematic diagram for the demodulation circuit 70 is illustrated. Additionally, reference will be made to FIG. 8, which is an exemplary timing diagram illustrating signal shape or waveform at various stages or sub-circuits of the demodulation circuit 70. The input signal to the demodulation circuit 70 is illustrated in FIG. 7 as Plot A, showing rising and falling edges from a "high" voltage ($V_{High}$) on the transmission antenna 21 to a "low" voltage ($V_{Low}$) on the transmission antenna 21. The voltage signal of Plot A may be derived from, for example, a current ($I_{Tx}$) sensed at the transmission antenna 21 by one or more sensors of the sensing system 50. Such rises and falls from $V_{High}$ to $V_{Low}$ may be caused by load modulation, performed at the wireless receiver system(s) 30, to modulate the wireless power signals to include the wireless data signals via ASK modulation. As illustrated, the voltage of Plot A does not cleanly rise and fall when the ASK modulation is performed; rather, a slope or slopes, indicating rate(s) of change, occur during the transitions from $V_{High}$ to $V_{Low}$ and vice versa.

As illustrated in FIG. 7, the slope detector 72 includes a high pass filter 71, an operation amplifier (OpAmp) $OP_{SD}$, and an optional stabilizing circuit 73. The high pass filter 71 is configured to monitor for higher frequency components of the AC wireless signals and may include, at least, a filter capacitor ($C_{HF}$) and a filter resistor ($R_{HF}$). The values for $C_{HF}$ and $R_{HF}$ are selected and/or tuned for a desired cutoff frequency for the high pass filter 71. In some examples, the cutoff frequency for the high pass filter 71 may be selected as a value greater than or equal to about 1-2 kHz, to ensure adequately fast slope detection by the slope detector 72, when the operating frequency of the system 10 is on the order of MHz (e.g., an operating frequency of about 6.78 MHz). In some examples, the high pass filter 71 is configured such that harmonic components of the detected slope are unfiltered. In view of the current sensor 57 of FIG. 5, the high pass filter 71 and the low pass filter 55, in combination, may function as a bandpass filter for the demodulation circuit 70.

$OP_{SD}$ is any operational amplifier having an adequate bandwidth for proper signal response, for outputting the slope of $V_{Tx}$, but low enough to attenuate components of the signal that are based on the operating frequency and/or harmonics of the operating frequency. Additionally or alternatively, $OP_{SD}$ may be selected to have a small input voltage range for $V_{Tx}$, such that $OP_{SD}$ may avoid unnecessary error or clipping during large changes in voltage at $V_{Tx}$. Further, an input bias voltage ($V_{Bias}$) for $OP_{SD}$ may be selected based on values that ensure $OP_{SD}$ will not saturate under boundary conditions (e.g., steepest slopes, largest changes in $V_{Tx}$). It is to be noted, and is illustrated in Plot B of FIG. 8, that when no slope is detected, the output of the slope detector 72 will be $V_{Bias}$.

As the passive components of the slope detector 72 will set the terminals and zeroes for a transfer function of the slope detector 72, such passive components must be selected to ensure stability. To that end, if the desired and/or available components selected for $C_{HF}$ and $R_{HF}$ do not adequately set the terminals and zeros for the transfer function, additional, optional stability capacitor(s) $C_{ST}$ may be placed in parallel with $R_{HF}$ and stability resistor $R_{ST}$ may be placed in the input path to $OP_{SD}$.

Output of the slope detector 72 (Plot B representing $V_{SD}$) may approximate the following equation:

$$V_{SD} = -R_{HF}C_{HF}\frac{dV}{dt} + V_{Bias}$$

Thus, $V_{SD}$ will approximate to $V_{Bias}$, when no change in voltage (slope) is detected, and $V_{SD}$ will output the change in voltage (dV/dt), as scaled by the high pass filter 71, when $V_{Tx}$ rises and falls between the high voltage and the low voltage of the ASK modulation. The output of the slope detector 72, as illustrated in Plot B, may be a pulse, showing slope of $V_{Tx}$ rise and fall.

$V_{SD}$ is output to the comparator circuit(s) 74, which is configured to receive $V_{SD}$, compare $V_{SD}$ to a rising rate of change for the voltage ($V_{SUp}$) and a falling rate of change for the voltage ($V_{SLo}$). If $V_{SD}$ exceeds or meets $V_{SUp}$, then the comparator circuit will determine that the change in $V_{Tx}$ meets the rise threshold and indicates a rising edge in the ASK modulation. If $V_{SD}$ goes below or meets $V_{SLow}$, then the comparator circuit will determine that the change in $V_{Tx}$ meets the fall threshold and indicates a falling edge of the ASK modulation. It is to be noted that $V_{SUp}$ and $V_{SLo}$ may be selected to ensure a symmetrical triggering.

In some examples, such as the comparator circuit 74 illustrated in FIG. 6, the comparator circuit 74 may comprise a window comparator circuit. In such examples, the $V_{SUp}$ and $V_{SLo}$ may be set as a fraction of the power supply determined by resistor values of the comparator circuit 74. In some such examples, resistor values in the comparator circuit may be configured such that $$V_{Sup} = V_{in}\left[\frac{R_{U2}}{R_{U1}+R_{U2}}\right]$$

$$V_{SLo} = V_{in}\left[\frac{R_{L2}}{R_{L1}+R_{L2}}\right]$$

where Vin is a power supply determined by the comparator circuit 74. When $V_{SD}$ exceeds the set limits for $V_{Sup}$ or $V_{SLo}$, the comparator circuit 74 triggers and pulls the output ($V_{Cout}$) low.

Further, while the output of the comparator circuit 74 could be output to the transmission controller 28 and utilized to decode the wireless data signals by signaling the rising and falling edges of the ASK modulation, in some examples, the SR latch 76 may be included to add noise reduction and/or a filtering mechanism for the slope detector 72. The SR latch 76 may be configured to latch the signal (Plot C) in a steady state to be read by the transmitter controller 28, until a reset is performed. In some examples, the SR latch 76 may perform functions of latching the comparator signal and serve as an inverter to create an active high alert out signal. Accordingly, the SR latch 76 may be any SR latch known in the art configured to sequentially excite when the system detects a slope or other modulation excitation. As illustrated, the SR latch 76 may include NOR gates, wherein such NOR gates may be configured to have an adequate propagation delay for the signal. For example, the SR latch 76 may include two NOR gates ($NOR_{Up}$, $NOR_{Lo}$), each NOR gate operatively associated with the upper voltage output 78 of the comparator 74 and the lower voltage output 79 of the comparator 74.

In some examples, such as those illustrated in Plot C, a reset of the SR latch 76 is triggered when the comparator circuit 74 outputs detection of $V_{SUp}$ (solid plot on Plot C) and a set of the SR latch 76 is triggered when the comparator circuit 74 outputs $V_{SLo}$ (dashed plot on Plot C). Thus, the reset of the SR latch 76 indicates a falling edge of the ASK modulation and the set of the SR latch 76 indicates a rising edge of the ASK modulation. Accordingly, as illustrated in Plot D, the rising and falling edges, indicated by the demodulation circuit 70, are input to the transmission controller 28 as alerts, which are decoded to determine the received wireless data signal transmitted, via the ASK modulation, from the wireless receiver system(s) 30.

Figure 9:
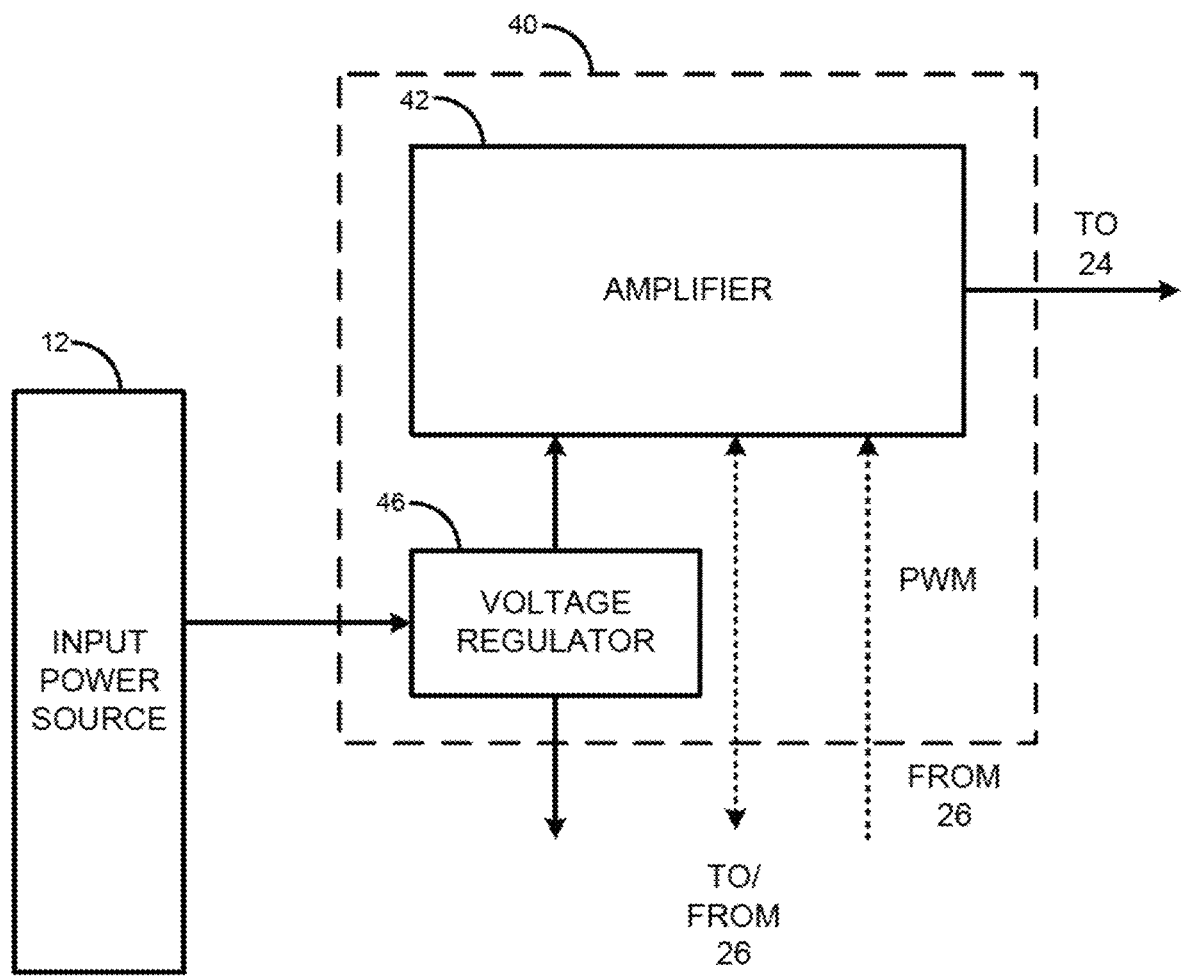
FIG. 9 is a timing diagram for voltages of an electrical signal, as it travels through the demodulation circuit, in accordance with FIGS. 1-8 and the present disclosure.

Referring now to FIG. 9, and with continued reference to FIGS. 1-7, a block diagram illustrating an embodiment of the power conditioning system 40 is illustrated. At the power conditioning system 40, electrical power is received, generally, as a DC power source, via the input power source 12 itself or an intervening power converter, converting an AC source to a DC source (not shown). A voltage regulator 46 receives the electrical power from the input power source 12 and is configured to provide electrical power for transmission by the antenna 21 and provide electrical power for powering components of the wireless transmission system 21. Accordingly, the voltage regulator 46 is configured to convert the received electrical power into at least two electrical power signals, each at a proper voltage for operation of the respective downstream components: a first electrical power signal to electrically power any components of the wireless transmission system 20 and a second portion conditioned and modified for wireless transmission to the wireless receiver system 30. As illustrated in FIG. 4, such a first portion is transmitted to, at least, the sensing system 50, the transmission controller 28, and the communications system 29; however, the first portion is not limited to transmission to just these components and can be transmitted to any electrical components of the wireless transmission system 20.

The second portion of the electrical power is provided to an amplifier 42 of the power conditioning system 40, which is configured to condition the electrical power for wireless transmission by the antenna 21. The amplifier may function as an invertor, which receives an input DC power signal from the voltage regulator 46 and generates an AC as output, based, at least in part, on PWM input from the transmission control system 26. The amplifier 42 may be or include, for example, a power stage invertor, such as a single field effect transistor (FET), a dual field effect transistor power stage invertor or a quadruple field effect transistor power stage invertor. The use of the amplifier 42 within the power conditioning system 40 and, in turn, the wireless transmission system 20 enables wireless transmission of electrical signals having much greater amplitudes than if transmitted without such an amplifier. For example, the addition of the amplifier 42 may enable the wireless transmission system 20 to transmit electrical energy as an electrical power signal having electrical power from about 10 mW to about 500 W. In some examples, the amplifier 42 may be or may include one or more class-E power amplifiers. Class-E power amplifiers are efficiently tuned switching power amplifiers designed for use at high frequencies (e.g., frequencies from about 1 MHz to about 1 GHZ). Generally, a single-ended class-E amplifier employs a single-terminal switching element and a tuned reactive network between the switch and an output load (e.g., the antenna 21). Class E amplifiers may achieve high efficiency at high frequencies by only operating the switching element at points of zero current (e.g., on-to-off switching) or zero voltage (off to on switching). Such switching characteristics may minimize power lost in the switch, even when the switching time of the device is long compared to the frequency of operation. However, the amplifier 42 is certainly not limited to being a class-E power amplifier and may be or may include one or more of a class D amplifier, a class EF amplifier, an H invertor amplifier, and/or a push-pull invertor, among other amplifiers that could be included as part of the amplifier 42.

Figure 10:
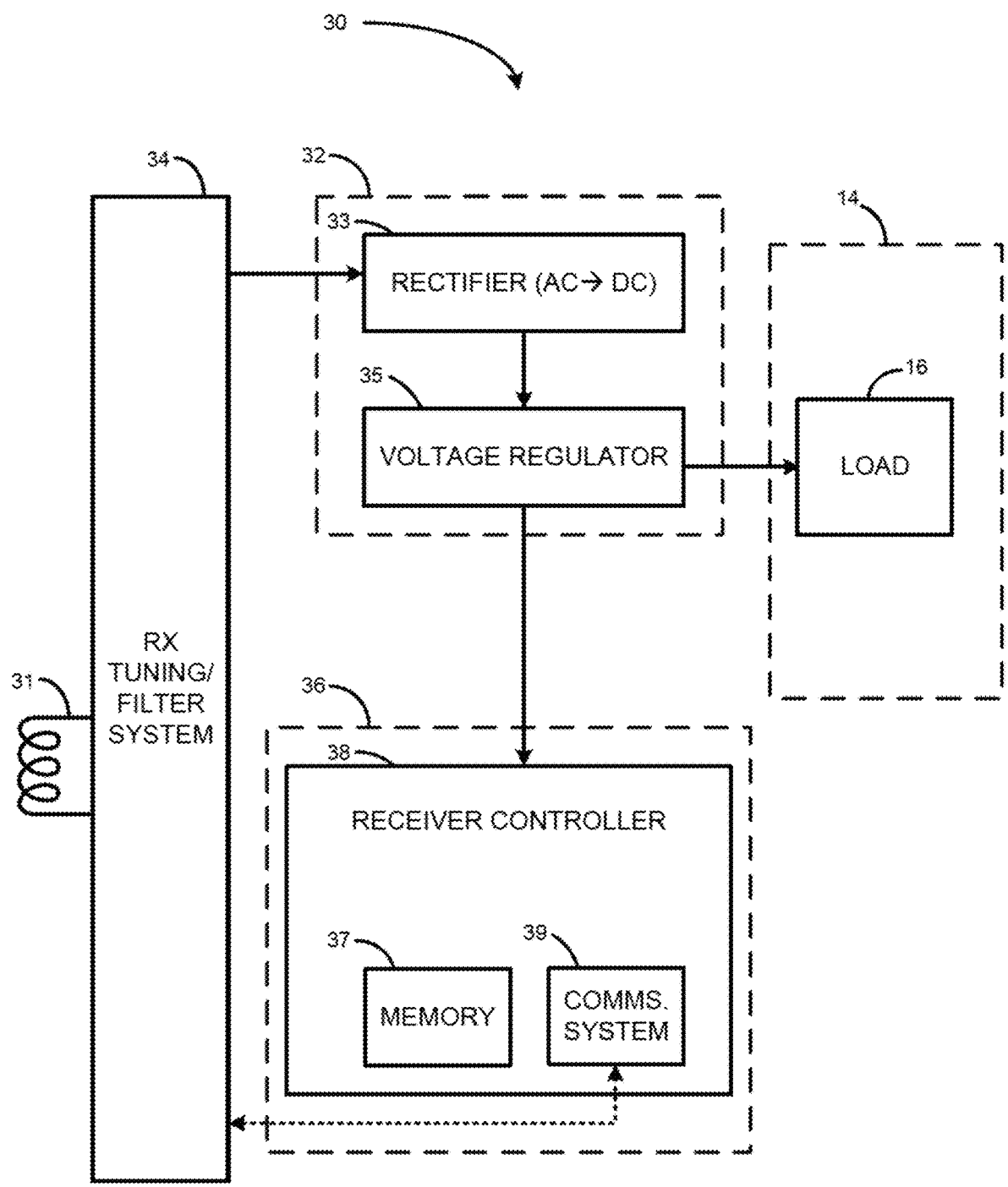
FIG. 10 is a block diagram illustrating components of a power conditioning system of the wireless transmission system of FIG. 3, in accordance with FIG. 2, FIGS. 3, and the present disclosure.

Turning now to FIG. 10 and with continued reference to, at least, FIGS. 1-3, the wireless receiver system 30 is illustrated in further detail. The wireless receiver system 30 is configured to receive, at least, electrical energy, electrical power, electromagnetic energy, and/or electrically transmittable data via near field magnetic coupling from the wireless transmission system 20, via the transmission antenna 21. As illustrated in FIG. 10, the wireless receiver system 30 includes, at least, the receiver antenna 31, a receiver tuning and filtering system 34, a power conditioning system 32, a receiver control system 36, and a voltage isolation circuit 70. The receiver tuning and filtering system 34 may be configured to substantially match the electrical impedance of the wireless transmission system 20. In some examples, the receiver tuning and filtering system 34 may be configured to dynamically adjust and substantially match the electrical impedance of the receiver antenna 31 to a characteristic impedance of the power generator or the load at a driving frequency of the transmission antenna 20.

As illustrated, the power conditioning system 32 includes a rectifier 33 and a voltage regulator 35. In some examples, the rectifier 33 is in electrical connection with the receiver tuning and filtering system 34. The rectifier 33 is configured to modify the received electrical energy from an alternating current electrical energy signal to a direct current electrical energy signal. In some examples, the rectifier 33 is comprised of at least one diode. Some non-limiting example configurations for the rectifier 33 include, but are not limited to including, a full wave rectifier, including a center tapped full wave rectifier and a full wave rectifier with filter, a half wave rectifier, including a half wave rectifier with filter, a bridge rectifier, including a bridge rectifier with filter, a split supply rectifier, a single phase rectifier, a three phase rectifier, a voltage doubler, a synchronous voltage rectifier, a controlled rectifier, an uncontrolled rectifier, and a half controlled rectifier. As electronic devices may be sensitive to voltage, additional protection of the electronic device may be provided by clipper circuits or devices. In this respect, the rectifier 33 may further include a clipper circuit or a clipper device, which is a circuit or device that removes either the positive half (top half), the negative half (bottom half), or both the positive and the negative halves of an input AC signal. In other words, a clipper is a circuit or device that limits the positive amplitude, the negative amplitude, or both the positive and the negative amplitudes of the input AC signal.

Some non-limiting examples of a voltage regulator 35 include, but are not limited to, including a series linear voltage regulator, a buck convertor, a low dropout (LDO) regulator, a shunt linear voltage regulator, a step up switching voltage regulator, a step down switching voltage regulator, an invertor voltage regulator, a Zener controlled transistor series voltage regulator, a charge pump regulator, and an emitter follower voltage regulator. The voltage regulator 35 may further include a voltage multiplier, which is as an electronic circuit or device that delivers an output voltage having an amplitude (peak value) that is two, three, or more times greater than the amplitude (peak value) of the input voltage. The voltage regulator 35 is in electrical connection with the rectifier 33 and configured to adjust the amplitude of the electrical voltage of the wirelessly received electrical energy signal, after conversion to AC by the rectifier 33. In some examples, the voltage regulator 35 may an LDO linear voltage regulator; however, other voltage regulation circuits and/or systems are contemplated. As illustrated, the direct current electrical energy signal output by the voltage regulator 35 is received at the load 16 of the electronic device 14. In some examples, a portion of the direct current electrical power signal may be utilized to power the receiver control system 36 and any components thereof; however, it is certainly possible that the receiver control system 36, and any components thereof, may be powered and/or receive signals from the load 16 (e.g., when the load 16 is a battery and/or other power source) and/or other components of the electronic device 14.

The receiver control system 36 may include, but is not limited to including, a receiver controller 38, a communications system 39 and a memory 37. The receiver controller 38 may be any electronic controller or computing system that includes, at least, a processor which performs operations, executes control algorithms, stores data, retrieves data, gathers data, controls and/or provides communication with other components and/or subsystems associated with the wireless receiver system 30. The receiver controller 38 may be a single controller or may include more than one controller disposed to control various functions and/or features of the wireless receiver system 30. Functionality of the receiver controller 38 may be implemented in hardware and/or software and may rely on one or more data maps relating to the operation of the wireless receiver system 30.

To that end, the receiver controller 38 may be operatively associated with the memory 37. The memory may include one or both of internal memory, external memory, and/or remote memory (e.g., a database and/or server operatively connected to the receiver controller 38 via a network, such as, but not limited to, the Internet). The internal memory and/or external memory may include, but are not limited to including, one or more of a read only memory (ROM), including programmable read-only memory (PROM), erasable programmable read-only memory (EPROM or sometimes but rarely labelled EROM), electrically erasable programmable read-only memory (EEPROM), random access memory (RAM), including dynamic RAM (DRAM), static RAM (SRAM), synchronous dynamic RAM (SDRAM), single data rate synchronous dynamic RAM (SDR SDRAM), double data rate synchronous dynamic RAM (DDR SDRAM, DDR2, DDR3, DDR4), and graphics double data rate synchronous dynamic RAM (GDDR SDRAM, GDDR2, GDDR3, GDDR4, GDDR5), a flash memory, a portable memory, and the like. Such memory media are examples of nontransitory computer readable memory media.

Further, while particular elements of the receiver control system 36 are illustrated as subcomponents and/or circuits (e.g., the memory 37, the communications system 39, among other contemplated elements) of the receiver control system 36, such components may be external of the receiver controller 38. In some examples, the receiver controller 38 may be and/or include one or more integrated circuits configured to include functional elements of one or both of the receiver controller 38 and the wireless receiver system 30, generally. As used herein, the term "integrated circuits" generally refers to a circuit in which all or some of the circuit elements are inseparably associated and electrically interconnected so that it is considered to be indivisible for the purposes of construction and commerce. Such integrated circuits may include, but are not limited to including, thin-film transistors, thick-film technologies, and/or hybrid integrated circuits.

Figure 11:
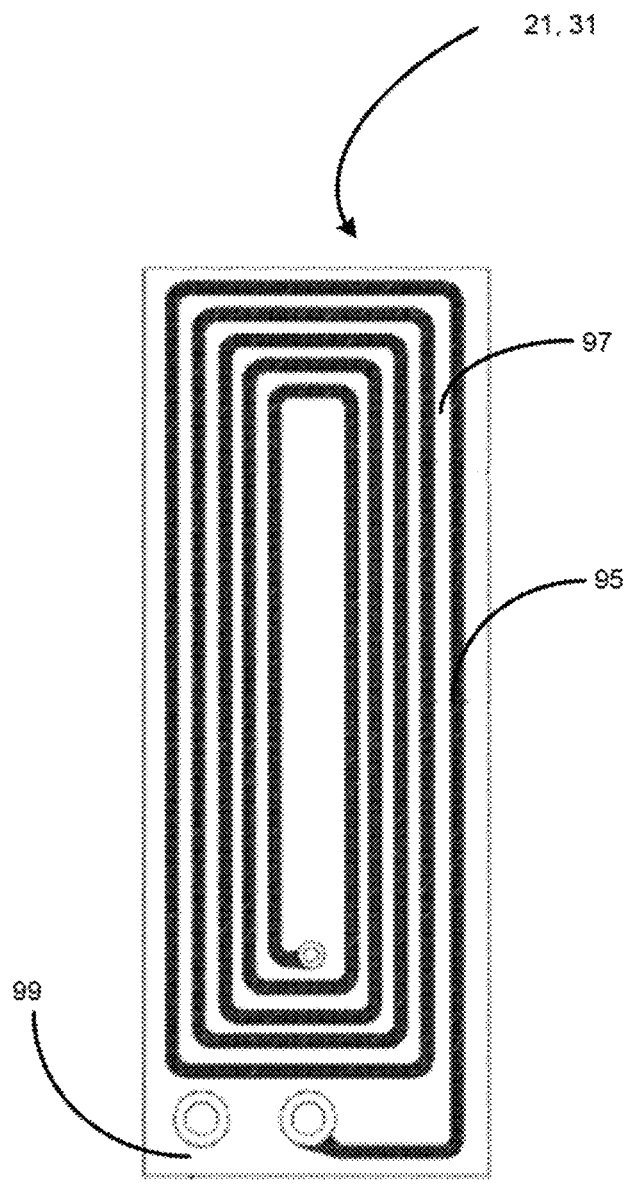
FIG. 11 is a block diagram illustrating components of a receiver control system and a receiver power conditioning system of the wireless receiver system of FIGS. 3, in accordance with FIG. 2, FIG. 3, and the present disclosure.

FIG. 11 illustrates an example, non-limiting embodiment of one or both of the transmitter antenna 21 and/or the receiver antenna 31 that may be used with any of the systems, methods, and/or apparatus disclosed herein. In the illustrated embodiment, the antenna 21, 31, is a flat spiral coil configuration. Non-limiting examples can be found in U.S. Pat. Nos. 9,941,743, 9,960,628, 9,941,743 all to Peralta et al.; 9,948,129, 10,063,100 to Singh et al.; 9,941590 to Luzinski; U.S. Pat. No. 9,960,629 to Rajagopalan et al.; and U.S. Patent App. Nos. 2017/0040107, 2017/0040105, 2017/0040688 to Peralta et al.; all of which are assigned to the assignee of the present application and incorporated fully herein by reference.

In addition, the antenna 21, 31 may be constructed having a multi-layer-multi-turn (MLMT) construction in which at least one insulator is positioned between a plurality of conductors. Non-limiting examples of antennas having an MLMT construction that may be incorporated within the wireless transmission system(s) 20 and/or the wireless receiver system(s) 30 may be found in U.S. Pat. Nos. 8,610,530, 8,653,927, 8,680,960, 8,692,641, 8,692,642, 8,698,590, 8,698,591, 8,707,546, 8,710,948, 8,803,649, 8,823,481, 8,823,482, 8,855,786, 8,898,885, 9,208,942, 9,232,893, and 9,300,046 to Singh et al., all of which are assigned to the assignee of the present application are incorporated fully herein. These are merely exemplary antenna examples; however, it is contemplated that the antennas 31 may be any antenna capable of the aforementioned higher power, high frequency wireless power transfer.

The systems, methods, and apparatus disclosed herein are designed to operate in an efficient, stable and reliable manner to satisfy a variety of operating and environmental conditions. The systems, methods, and/or apparatus disclosed herein are designed to operate in a wide range of thermal and mechanical stress environments so that data and/or electrical energy is transmitted efficiently and with minimal loss. In addition, the system 10 may be designed with a small form factor using a fabrication technology that allows for scalability, and at a cost that is amenable to developers and adopters. In addition, the systems, methods, and apparatus disclosed herein may be designed to operate over a wide range of frequencies to meet the requirements of a wide range of applications.

In an embodiment, a ferrite shield may be incorporated within the antenna structure to improve antenna performance. Selection of the ferrite shield material may be dependent on the operating frequency as the complex magnetic permeability ($\mu=\mu'-j*\mu''$) is frequency dependent. The material may be a polymer, a sintered flexible ferrite sheet, a rigid shield, or a hybrid shield, wherein the hybrid shield comprises a rigid portion and a flexible portion. Additionally, the magnetic shield may be composed of varying material compositions. Examples of materials may include, but are not limited to, zinc comprising ferrite materials such as manganese-zinc, nickel-zinc, copper-zinc, magnesium-zinc, and combinations thereof.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more embodiments, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

Reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub combination or variation of a sub combination.

The invention claimed is:

1. A sensing system for a device, the sensing system comprising a wireless transmission system and a wireless receiver system that are configured to wirelessly couple with one another, wherein the sensing system is configured to:
    determine sensor data that is associated with a sensing environment from a sensor operatively associated with the wireless receiver system, the sensing environment associated with the device;
    wirelessly provide electrical energy to the sensor via wireless power signals;
    transmit data from the wireless receiver system to the wireless transmission system as in-band data signals encoded in the wireless power signals; and
    decode the in-band data signals from the wireless power signals to determine sensor data associated with the sensor.

2. The sensing system of claim 1, wherein the device is a host device and the sensor is provided within the host device and the sensing environment is within the host device.

3. The sensing system of claim 1, wherein the device is an associated device and the sensor is external to the associated device.

4. The sensing system of claim 1, wherein decoding the in-band data signals from the wireless power signals to determine sensor data associated with the sensor comprises (i) receiving electrical information from a current sensor, (ii) detecting a change in the electrical information, (iii) determining if the change in the electrical information meets or exceeds one of a rise threshold or a fall threshold, (iv) if the change exceeds one of the rise threshold or the fall threshold, generating an alert, and (v) outputting a plurality of data alerts.

5. The sensing system of claim 4, wherein the electrical information comprises one or more of a current of the wireless power signals, a voltage of the wireless power signals, a power level of the wireless power signals, or combinations thereof.

6. The sensing system of claim 1, wherein the wireless transmission system comprises a demodulation circuit and wherein decoding the in-band data signals from the wireless power signals to determine sensor data associated with the sensor further comprises receiving a plurality of data alerts from the demodulation circuit, and (ii) decoding the plurality of data alerts into the sensor data.

7. The sensing system of claim 6, wherein the demodulation circuit comprises a slope detector circuit that is configured to detect a change in electrical information.

8. The sensing system of claim 7, wherein the slope detector circuit comprises a high pass filter.

9. The sensing system of claim 8, wherein a cutoff frequency for the high pass filter is greater than or equal to about 1 kilohertz (kHz).

10. The sensing system of claim 7, wherein the slope detector circuit comprises an operation amplifier.

11. The sensing system of claim 1, wherein transmitting data from the wireless receiver system to the wireless transmission system as in-band data signals encoded in the wireless power signals comprises encoding the in-band data signals as amplitude shift keying (ASK) data signals.

12. The sensing system of claim 11, wherein encoding the in-band data signals as amplitude shift keying (ASK) data signals comprises encoding the in-band data signals as high threshold and low threshold voltages of the wireless power signals.

13. The sensing system of claim 12, wherein a rise threshold is associated with the high threshold voltage and a fall threshold is associated with the low threshold voltage.

14. The sensing system of claim 12, wherein the in-band data signals are encoded as pulse width encoded in-band data signals.

15. The sensing system of claim 1, wherein each of the wireless transmission system and the wireless receiver system operates at an operating frequency of about 6.78 megahertz (MHz).

16. The sensing system of claim 1, wherein each of the wireless transmission system and the wireless receiver system operates at an operating frequency of about 13.56 megahertz (MHz).

17. The sensing system of claim 1, wherein the sensing environment is a fluid chamber and the sensor data is data associated with the fluid chamber.

18. The sensing system of claim 17, wherein the sensor data is a fluid level associated with the fluid chamber.

19. The sensing system of claim 1, wherein the sensor includes a temperature sensor.

20. The system of claim 19, wherein the sensor data includes temperature data associated with a fluid chamber.

* * * * *